US006192418B1

(12) United States Patent
Hale et al.

(10) Patent No.: US 6,192,418 B1
(45) Date of Patent: *Feb. 20, 2001

(54) SYSTEM AND METHOD FOR PERFORMING EXTERNAL PROCEDURE CALLS FROM A CLIENT PROGRAM TO A SERVER PROGRAM WHILE BOTH ARE OPERATING IN A HETEROGENOUS COMPUTER

(75) Inventors: J. Calvin Hale, Rancho Santa Margarita; Mark Joseph Rentmeesters, Irvine; Norman Roy Smith, Lake Forest, all of CA (US)

(73) Assignee: Unisys Corp., Blue Bell, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/882,641

(22) Filed: Jun. 25, 1997

(51) Int. Cl.[7] .............................. G06F 9/54; G06F 15/167
(52) U.S. Cl. ............................................ 709/312; 709/330
(58) Field of Search .............................. 395/684, 200.32, 395/200.31; 709/304, 300, 312, 310, 330, 213

(56) References Cited

U.S. PATENT DOCUMENTS

| 4,297,743 | * | 10/1981 | Appell et al. | 364/200 |
|---|---|---|---|---|
| 4,590,551 | | 5/1986 | Mathews | 395/200 |
| 4,722,048 | * | 1/1988 | Hirsch et al. | 364/200 |
| 4,862,354 | * | 8/1989 | Fiacconi et al. | 364/200 |
| 5,027,271 | * | 6/1991 | Curley et al. | 364/200 |
| 5,222,215 | | 6/1993 | Chou et al. | 395/275 |
| 5,230,065 | * | 7/1993 | Curley et al. | 395/200 |
| 5,329,619 | | 7/1994 | Page et al. | 395/200 |
| 5,339,422 | | 8/1994 | Brender | 395/700 |
| 5,357,612 | | 10/1994 | Alaiwan | 395/200 |
| 5,442,791 | | 8/1995 | Wrabetz et al. | 395/650 |
| 5,619,685 | * | 4/1997 | Schiavone | 395/500 |
| 5,659,701 | * | 8/1997 | Amit et al. | 395/684 |
| 5,793,965 | | 8/1998 | Vanderbilt et al. | 395/200.33 |
| 5,878,384 | * | 3/1999 | Johnson et al. | 702/187 |

FOREIGN PATENT DOCUMENTS

| 402039347 | * | 2/1990 | (JP) | G06F/15/16 |

OTHER PUBLICATIONS

AHO, "Compilers Principles, Techniques, and Tools," Bell Telephone Laboratories, Incorporated, pp. 404–427, and 522–529, Mar. 1988.*

Aschmann, Hans–Ruedi, et al. "Alphorn: A Remote Procedure Call Environment for Fault–Tolerant, Heterogeneous, Distributed Systems", 1991.*

"Remote Procedure Calls", IBM TDB, Jun. 1992; pp. 237–238.

"Stimulating Shared Buffer Communication in a Distributed Processing Environment", IBM TDB, Apr. 1992; pp. 340–350.

(List continued on next page.)

Primary Examiner—Alvin E. Oberley
Assistant Examiner—Lewis A. Bullock, Jr.
(74) Attorney, Agent, or Firm—J. Ronald Richebourg; Rocco L. Adornato; Mark T. Starr

(57) ABSTRACT

There is provided a system and method in a heterogeneous multiprocessing system for performing external procedure calls from a Client Program to a Server Program, both of which are stored in a common memory. The Client Program is executed by a first CPU under control of a first operating system and the Server Program is executed by a second CPU under control of a second operating system. The first and second operating systems are also stored in the common memory. The Client Program includes a Proxy Procedure for invoking a Server program function, and a Stub Procedure for converting parameter and result data from the first to the second operating system. The Client Program further includes a Protocol Procedure for passing data between the Client and Server CPUs.

19 Claims, 28 Drawing Sheets

OTHER PUBLICATIONS

"Data Type Transformation in Heterogeneous Shared Memory Multiprocessing", pp. 164–170 of the Journal of Paralled and Distributed Computing, 12, By Michael W. Strevell and Harvey G. Gragon, Department of Electrical Engineering, U.S. Air Force Academy, Colorado, 80840–5701.

(Oracle) "Oracle8 Enterprise Edition Getting Started for Windows NT" and "PL/SQL User's Guide and Reference" Chapter 10 External Procedures, Jun. 12, 1997.*

(Benjamin) Benjamin, Louis E. Jr. "Taking the fourth" Apr. 1988.*

* cited by examiner

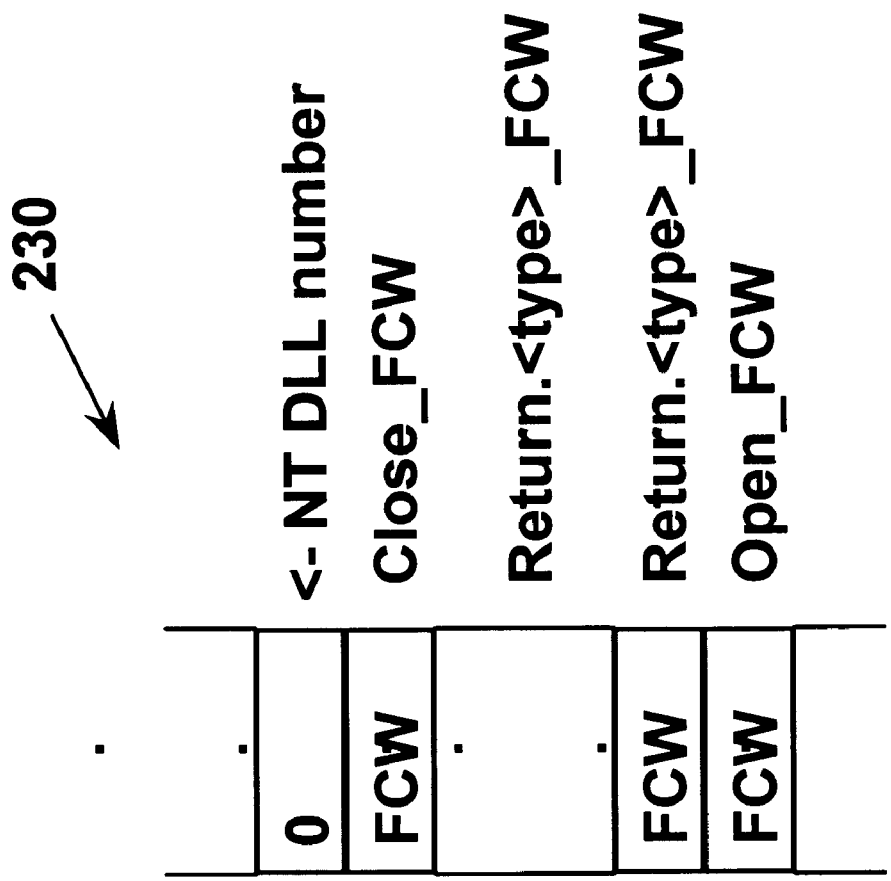

SYSTEM AND METHOD FOR PERFORMING EXTERNAL PROCEDURE CALLS FROM A CLIENT PROGRAM TO A SERVER PROGRAM WHILE BOTH ARE OPERATING IN A HETEROGENOUS COMPUTER

CROSS REFERENCE TO RELATED APPLICATIONS

This application relates to the following co-pending applications, assigned to the same assignee hereof, which are incorporated herein by reference.

U.S. Ser. No. 08/882,639, entitled A NEW AND IMPROVED SYSTEM AND METHOD FOR PERFORMING EXTERNAL PROCEDURE CALLS IN A HETEROGENEOUS COMPUTER;

U.S. Ser. No. 08/882,640, entitled A SYSTEM AND METHOD FOR PERFORMING EXTERNAL PROCEDURE CALLS FROM A SERVER PROGRAM TO A CLIENT PROGRAM WHILE BOTH ARE RUNNING IN A HETEROGENEOUS COMPUTER;

U.S. Ser. No. 08/882,643, entitled A SYSTEM AND METHOD FOR PERFORMING EXTERNAL PROCEDURE CALLS FROM A CLIENT PROGRAM TO A SERVER PROGRAM, AND BACK TO THE CLIENT PROGRAM WHILE BOTH ARE RUNNING IN A HETEROGENEOUS COMPUTER.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to external procedure calls in a computer system executing a program, and in particular to a method for performing external procedure calls from a client program to a server program while both are running simultaneously in a heterogeneous computer system that shares a common memory. The term "External Procedure Calls" (or "EPC") is used herein to refer to the making of a function call from one operating environment to another in such a heterogeneous computer system. The term "heterogeneous multiprocessing system" refers to a single computer system having two or more Central Processing Units (CPUs) that operate with a shared memory and utilize two or more different operating systems.

BACKGROUND OF THE INVENTION

In general computer programs include a number of internal functions, plus computer codes which call these functions in a specific order. This approach works well when all of the necessary functions are available within a single program. However, there are times when a required function is located elsewhere. Such functions are normally referred to as remote, or external functions.

One way to make these remote or external functions available to a program is to incorporate them into the local program. When feasible, this is the most efficient approach. However, remote or external functions sometimes depend upon other things (e.g., data, operating systems, hardware, etc.), which may not be available to the local program. In such situations, importing the remote or external function to the local program is not possible. Hence, the only alternative is to invoke the desired function remotely. These are known as Remote Procedure Calls (RPC's), which are available for such use. RPC's operate much, much slower than internal functions, in fact they are four or more orders of magnitude slower.

Some systems provide a streamlined RPC mechanism for use in shared memory environments, which are referred to as Local Procedure Calls (LPC). This capability eliminates the overhead of moving a function call across a network and reduces the per call overhead to less than 1 microsecond with today's microprocessors. Local Procedure Calls, however, are only available when all of the functions are running under the control of one single operating system. In a heterogeneous multiprocessing (HMP) system, there is a desire to have two different operating systems closely cooperating to carry out certain tasks.

Technologies are available for carrying out this cooperation, which are variants of Remote Procedure Calls (RPCs). RPCs operate over a network transport of some sort, and serve to physically move a request from one environment to another. At best, they operate in the range of 100 microseconds overhead per call. While this overhead is acceptable for some long operations, it is excessive for short operations, making cooperation impractical. In addition, the 100 microsecond or greater overhead must be incurred by each function call, further reducing the desirability of RPCs. A function calling sequence with drastically reduced overhead is required.

In shared memory HMP environments, there is no need to physically move the function from the memory of one operating environment to the memory of the other. Both operating environments share a single memory. External Procedure Calls take advantage of the shared memory in an HMP system to expedite the calling sequence between operating environments, allowing overheads of less than 1 microsecond using today's Instruction Processors or as referred to herein Central Processing Units (CPU's). This overhead reduction allows EPCs to be used for cooperative processing where RPCs would be impractical. Examples of potential uses for EPCs include: direct use of DMSII verbs from NT applications and direct use of NT security and encryption algorithms from MCP environments.

SUMMARY OF THE INVENTION

In accordance with the above and other objects, features and advantages of the invention there is provided a system and method in a heterogeneous multiprocessing system for performing external procedure calls from a Client Program to a Server Program, both of which are stored in a common memory. The Client Program is executed by a first CPU under control of a first operating system and the Server Program is executed by a second CPU under control of a second operating system. The first and second operating systems are also stored in the common memory. The Client Program includes a Proxy Procedure for invoking a Server program function, and a Stub Procedure for converting parameter and result data from the first to the second operating system. The Client Program further includes a Protocol Procedure for passing data between the Client and Server CPUs.

An object of the present invention is to provide a direct calling sequence from a program running in one operating system environment to another program running in another operating system environment. This includes the direct mapping of parameters and return values.

A feature of the present invention is that a function being called is written in standard Windows NT languages (primarily C or C++, although Java, Delphi, Visual Basic and other languages are possible). The functions need not be aware that they are being called from a foreign environment. It is noted at this juncture of the description that the term NT or NT Operating System is used to mean the Windows NT Operating System available from Microsoft Corporation of Redmond, Wash.

An advantage of the present invention is that the called functions are packaged in the same way they would be for use in the native environment, and are fully usable in the native environment. For NT, functions are packaged in a standard DLL format, and are fully usable by both NT programs, and (once set up) by MCP programs as well. MCP is the name of the operating system for A Series Computers available from Unisys Corporation of Blue Bell, Pa., assignee of this patent application.

Another advantage of the present invention is that the mechanism supports all parameter types that can be readily mapped from the initiating environment to the target environment. This is a subset of all possible parameter types. Simple on-stack parameter types are supported (word values, such as int, long, unsigned, float, INTEGER, REAL are all supported). Simple off-stack arrays are also supported (char*, int*, long*, INTEGER ARRAY, REAL ARRAY, EBCDIC ARRAY). Array contents can either be translated, or left in native format, at the option of the developer.

By use of the present invention, modern computers can execute in excess of 1,000,000 External Procedure Calls per second, using the ClearPath HMP systems available from Unisys Corporation, assignee of this patent application. These speeds are well within one order of magnitude of local function calls, and are a full three orders of magnitude faster than the prior art Remote Procedure Calls. This speed allows programmers to use remote or external functions for many more purposes than were possible using standard Remote Procedure Calls.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the spirit and scope of the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION

Figure 1:
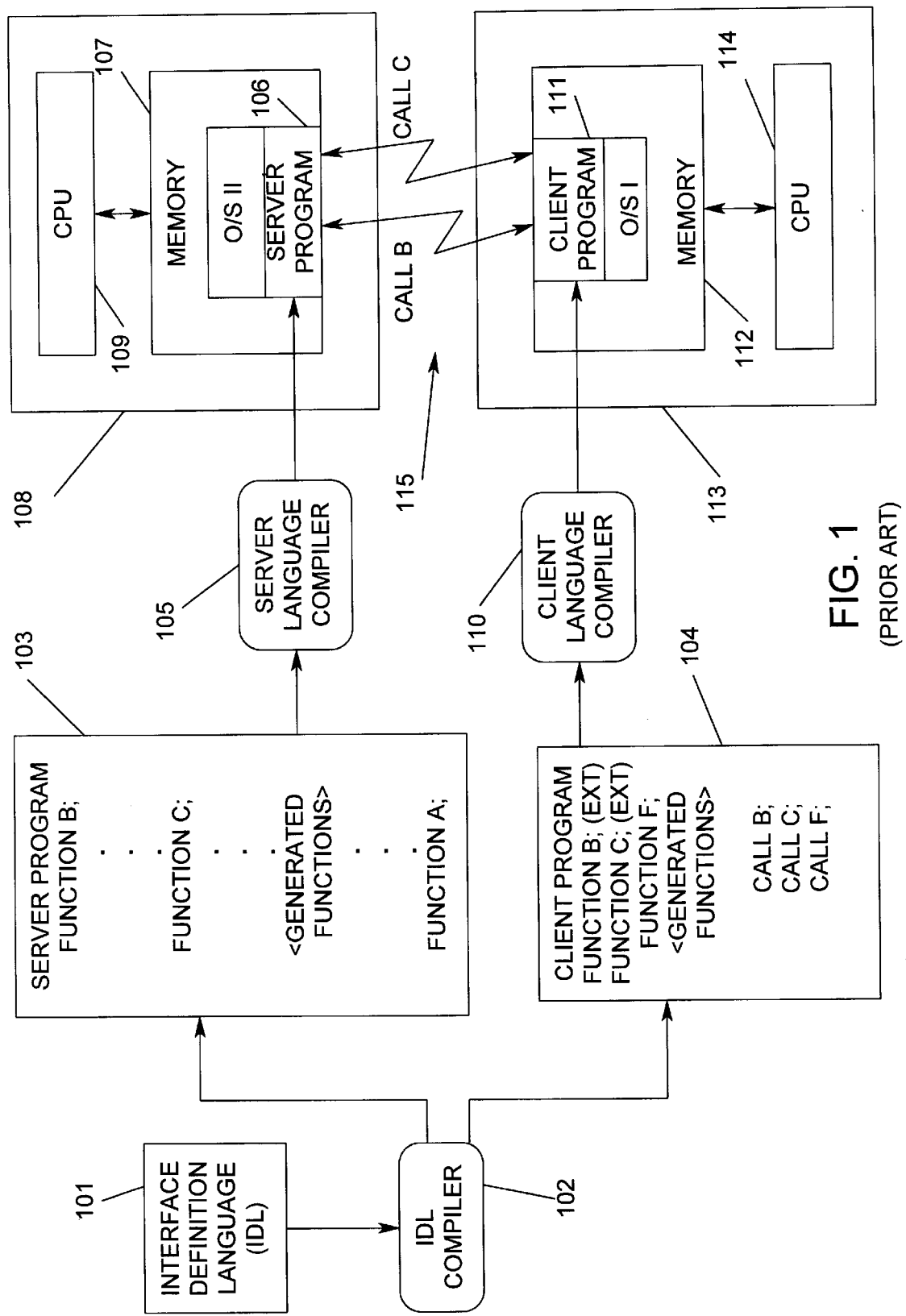
FIG. 1 is a block diagram of software modules of the prior art remote procedure call schema.

Referring now to FIG. 1, a block diagram illustrates the computer system and software modules that form the prior art remote procedure call schema. Remote or external functions are first identified through an Interface Definition Language (IDL block 101), which are processed by an IDL compiler 102 to produce two program skeletons for exemplary functions B and C: i.e., a Server Program skeleton 103 and a Client Program skeleton 104. The Server Program skeleton 103 contains declarations for the remote or external functions (Functions B and C in this example), plus some Generated Functions to allow the remote or external functions to be accessed remotely. A computer programmer adds computer codes to the Server Program to provide the actual workings of each remote or external function (e.g., Functions B and C). The computer programmer may also add additional functions that are not remotely or externally callable (e.g., Function A). The resulting program is then compiled with a server language compiler 105 to produce an executable Server Program 106 stored in a memory 107 of a computer 108 having a CPU 109 coupled thereto. An operating system O/S II for the CPU 109 is also stored in the memory 107 and controls operation of the CPU 109, the memory 107 and the Server Program 106.

The Client Program skeleton 104 contains declarations for the remote or external functions as well, with indications that they are remote or external (again, Functions B and C). The Client Program skeleton 104 also contains Generated Functions to allow the remote or external functions to be accessed remotely. A computer programmer adds codes to the Client Program skeleton 104 to provide the actual workings of the program itself, including calls to the remote or external functions (for example, statements CALL B and CALL C). The computer programmer may also add additional functions that are accessed locally (e.g., Function F). The resulting program is then compiled with a client language compiler 110 to produce an executable Client Program 111 stored in a memory 112 of a computer 113 having a CPU 114 coupled thereto. An operating system O/S I for the CPU 114 is also stored in the memory 112 and controls operation of the CPU 114, the memory 112 and the Client Program 111.

At this stage, the programs are ready for execution. The Client Program 111 is started on the computer 113 under the control of O/S I. The Server Program 106 is started on the computer 108 under the control of the operating system O/S II. The mechanisms for starting each program are specific to the computers on which they run; and, since such mechanisms are well known in the art, will not be further described herein. It is pointed out that each computer could be using entirely different operating systems, comprising entirely different hardware, utilizing entirely different CPUs and instruction sets, and having access to entirely different hardware and software resources.

When the Client Program 111 calls one of the remote or external functions (e.g., CALL B), the Generated Functions intercept the CALLS and transport them to the computer 108, via a network 115, where the Server Program 106 is running. Then, using the Generated Functions of the Server Program 106, the remote or external function is invoked in the Server Program 106. When the invoked function is finished, any results are returned to the Client Program 111 in a like manner. The Generated Functions are obliged to communicate over the network 115 between the two computers; and, are obliged to perform any data translations and network protocols necessary to transport call requests, parameters and responses from one computer to the other.

There is a problem with the previously described solution. When a function is called locally within a program, the overhead necessary to make the function call is several CPU instructions in length. (Note that today's CPUs can execute tens of millions of function calls per second.) When a function is remote or external, the Generated Functions have a large amount of work to do. This work becomes an integral part of the function invocation, which is overhead that takes thousands of CPU instructions, plus transmission delays. The result is that today's computers can execute on the order of 50 to 1,000 remote or external function calls per second. Thus, remote or external function calls operate around 4 orders of magnitude slower than local function calls. This makes remote or external function calls impractical for many applications.

Figure 2:
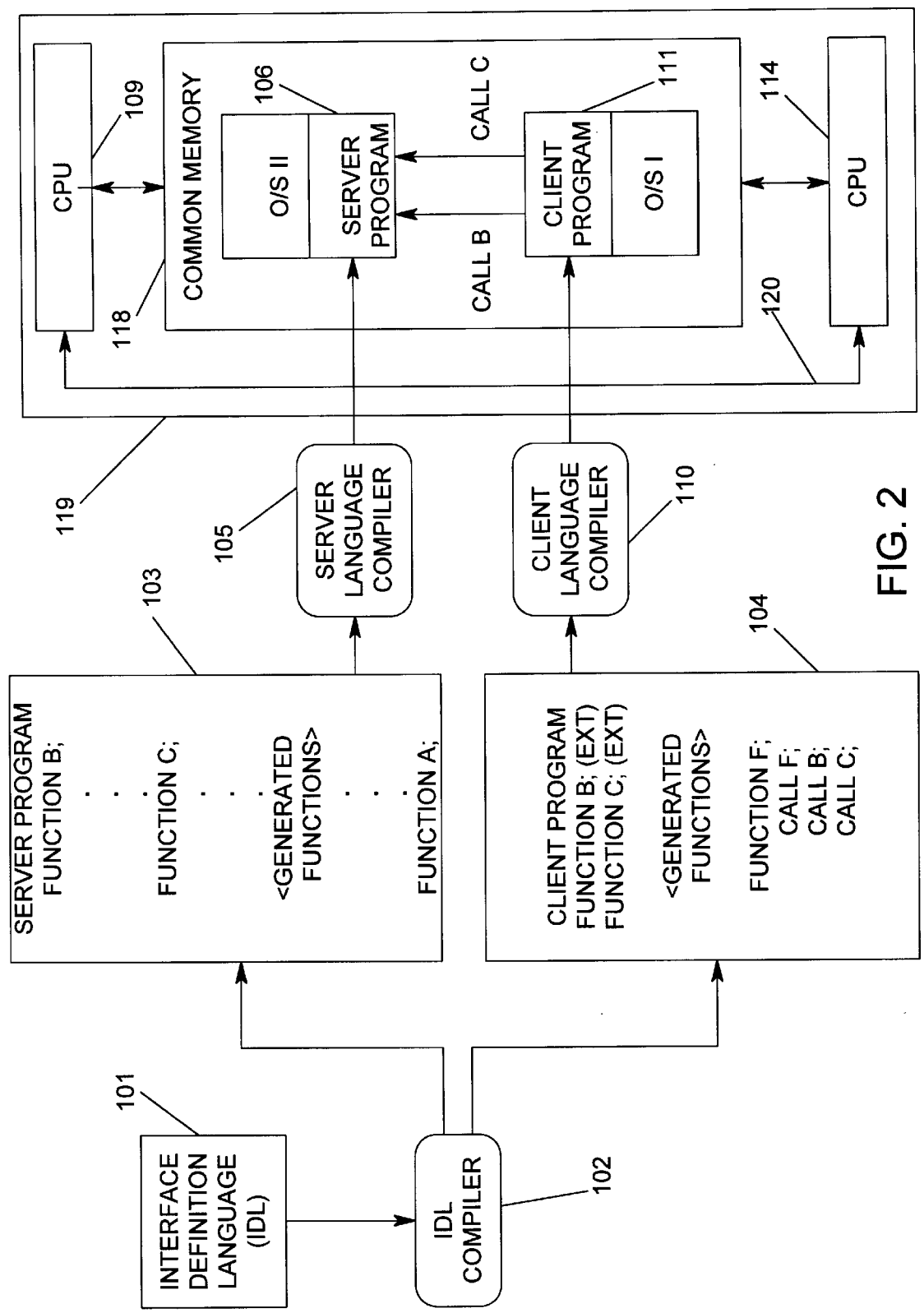
FIG. 2 is a block diagram of software modules of the schema of the present invention tailored to illustrate the development steps involved in creating EPC programs.

Referring now to FIG. 2, a block diagram illustrates the sequence of steps necessary to develop programs that could make use of the method of the present invention. External Procedure Calls begin with the same basic approach as Remote Procedure Calls. The same Interface Definition Language 101 is used, and the same IDL compiler 102 generates a Server Program skeleton 103, and a Client Program skeleton 104. There are differences however in the Generated Functions, but these differences are transparent to the computer programmer. The computer programmer performs the identical steps of completing each program, and compiling it using the same appropriate language compiler 105 or 110. The resulting programs 106 and 111, respectively, are then run on a Heterogeneous Multiprocessing System, which is a special computer system 119 having two operating system environments (O/S I and O/S II) controlling two CPU's (CPU 114 and CPU 109) connected in a very closely coupled way by means of a bus 120. A suitable ex ample of such a system is the ClearPath HMP systems delivered by Unisys Corporation, assignee of this patent application. The only special requirements for such a computer system are that it must incorporate a shared memory 118 between the two Operating Systems, and there must be a high-speed CPU-to-CPU signaling bus available, such as the bus 120.

When the Client Program 111 calls a remote or external function using External Procedure Calls, the Generated Functions operate to invoke the appropriate Server function at very nearly the same speed as if the function was a local one. This is accomplished while still allowing the Operating Systems involved to be different, allowing entirely different hardware, utilizing entirely different CPUs and instruction sets, and having access to entirely different hardware and software resources. Only the two special requirements of a common memory and a high-speed CPU-to-CPU signaling bus need be satisfied.

Remote or external functions are first identified through an Interface Definition Language (IDL block 101), Which are processed by an IDL compiler 102 to produce two program skeletons for exemplary Functions B and C: i.e., a Server Program skeleton 103 and a Client Program skeleton 104. The Server Program skeleton 103 contains declarations for the remote or external functions (Functions B and C in this example), plus additional Generated Functions that allow the remote or external functions to be accessed remotely.

In one embodiment of the present invention, the Client Program 111 running in the MCP (Master Control Program) environment makes a call on the Server Program 106 running in the Windows NT environment. The External Procedure Call implementation will make use of the Microsoft Interface Definition Language, with extensions, to define the protocol between the client and server programs. This IDL will be compiled by an EIDL (E-Mode Interface Definition Language) compiler, which parses the IDL input file and generates the following:

Proxy Procedures: Specific examples of the Generated Functions referenced in both the Server and Client Program skeletons 103 and 104, respectively. These are Client Program procedures that the Client program calls when it wishes to invoke a Server Program function. They have the same parameters and procedure types as the procedures defined in the IDL specification. The Proxy Procedure calls an appropriate Protocol Procedure, which is responsible for notifying the Windows NT Operating System (i.e., O/S II) that a function in the Server Program is to be called.

Stub Procedures: Specific examples of the Generated Functions referenced in both the Server and Client Program skeletons 103 and 104, respectively; and, are Server Program procedures that convert the parameter and result data between the O/S I and the O/S II formats, and call the appropriate Windows NT Server Procedures. It is pointed out that one skilled in the art who reads this patent is able to develop Client Program procedures that convert the parameter and result data between O/S II (CPU 109) and O/S I (CPU 114).

Server Skeletons: These are depicted as Server Programs in FIGS. 1 and 2 and contain the NT Server Procedure headings and empty bodies. NT Server Procedure headings and empty bodies are shown in FIGS. 1 and 2 as FUNCTION B and FUNCTION C, respectively, inside the Server Program skeleton 103. The application programmer is responsible for providing the logic within the procedure bodies, which is then referred to as a Server Procedure.

FCW Protocol Procedures: In one embodiment of the present invention, an additional type of procedure is provided in the Generated Functions for use by Proxy and Stub Procedures referred to herein as an FCW Protocol Procedure. The FCW Protocol Procedures embody the specific mechanisms used to pass information between the CPU 114 and the CPU 109 in the Heterogeneous Multiprocessing System 119, and serve as the mechanism by which an MCP Client Program can notify the Windows NT Operating System that a Server Program function is about to be called.

The MCP Client Program is responsible for initiating the connection between the MCP Operating System (i.e., O/S I) and the Windows NT programs, which connection is established by calling the Open_FCW Protocol Procedure.

Figure 3:
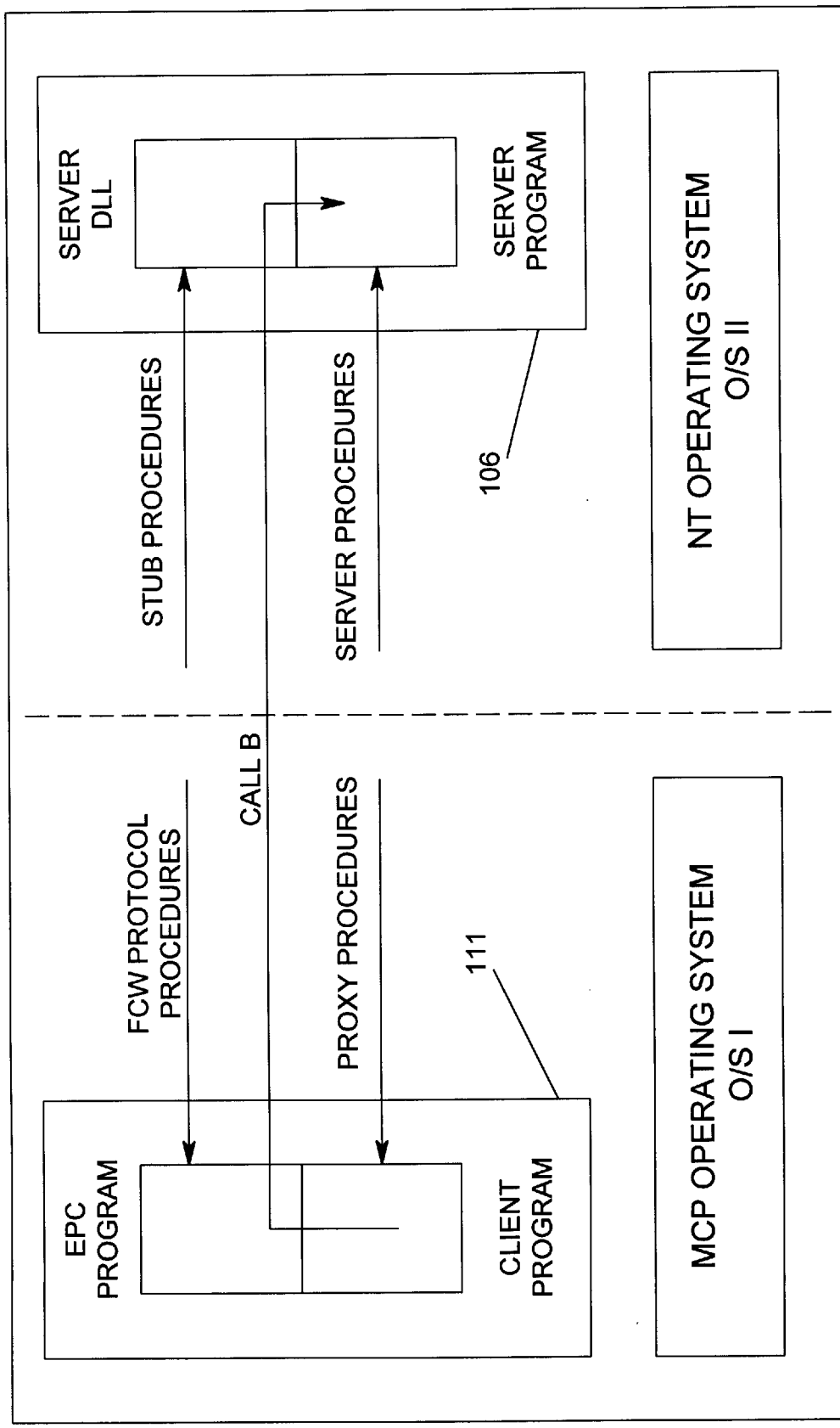
FIG. 3 is another block diagram of the software modules of the schema of the present invention that illustrates the operation of external procedure calls from a Client Program to a Server Program at run-time.

Referring now to FIG. 3, there is illustrated a block diagram of the software modules of the schema of the present invention stored in the common memory 118. This diagram represents a run-time composition of the Server Program 106 and the Client Program 111 for external procedure calls, as well as the sequence of operations for procedure calls from the Client Program to the Server Program. For purposes of illustration only of a specific embodiment of the method of the present invention, the Client Program 111 comprises an EPC program (i.e., External Procedure Call) executable by an MCP operating system (i.e., Master Control Program, or O/S I) running on a Unisys A Series computer. An exemplary Server Program 106 is shown as a DLL (i.e., Dynamic Link Library) executable by the Windows NT Operating System (i.e., O/S II).

In operation, when the Client Program 111 wishes to call a Server Program 106 function (for example, CALL B), the Client Program 111 instead calls the corresponding Proxy Procedure for Function B (CALL B). This Proxy Procedure notifies the Windows NT Operating System that a Server Program 106 function is about to be called. Windows NT invokes the corresponding Stub Procedure in the Server Program 106. The Stub Procedure performs any parameter translation necessary, and calls the actual Server Function B. When the Server Function B finishes, the Stub Procedure performs any parameter and return value translation necessary, and informs the Windows NT Operating System to return control to the Client Program 111. Windows NT notifies the MCP Operating System to resume operation of the Client Program 111. The Client Program. 111 then continues processing, making us e of the para meters and result values from the Server Program 106 Function B. The details of this process are amplified in the description to follow and with reference to the flow chart illustrated in FIGS. 4A through 4D.

Figure 4A:
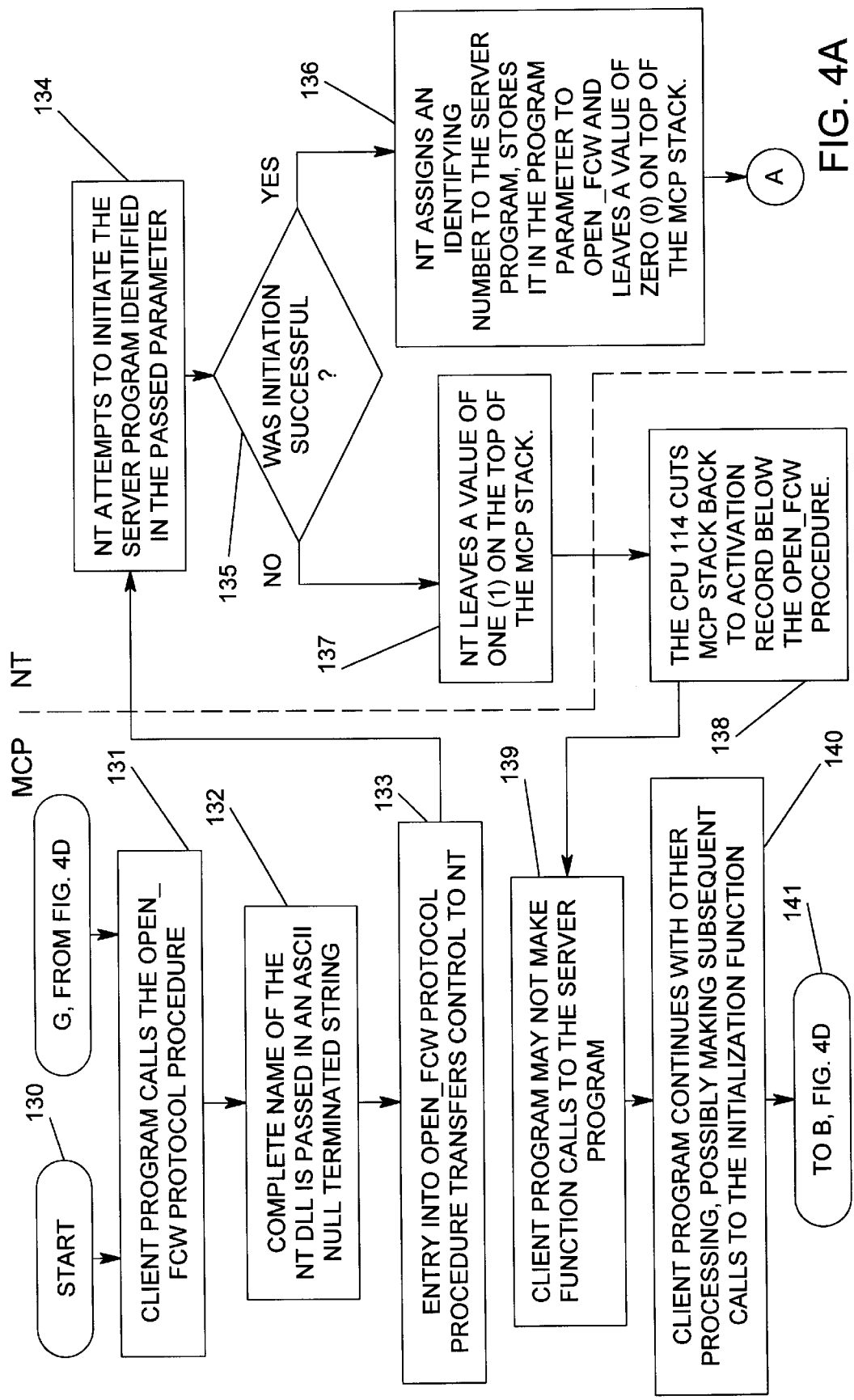
FIGS. 4A through 4D combined form a flow chart of the Server Program portion of the present invention.

Referring now to FIG. 4A, the first of a four-part diagram illustrating the steps of the method of the present invention is shown. A convention used in organizing FIGS. 4A through 4D, is to illustrate the steps performed by the first operating system ("MCP") on the left-hand side of each sheet of the drawings and the steps performed by the second operating system ("NT") on the right-hand side of each sheet, unless otherwise noted. Likewise, with reference to FIG. 5A, the first of a 21-part diagram illustrating the steps of the method of the present invention is shown. A convention used in organizing FIGS. 5A through 5W is to illustrate the steps performed by the first operating system (i.e., "MCP") on the left-hand side of each sheet of the drawing (that part of the illustration without a border) and the steps performed by the second operating system ("NT") on the right-hand side of each sheet (that part of the illustration contained within a border), unless otherwise noted. The steps shown in FIGS. 4A through 4D and FIGS. 5A through 5W are two ways of illustrating the same steps, and the description which follows applies to both illustrations. The method or process begins in the MCP with a start bubble 130 (230, FIG. 5A) followed by a step performed by the Client Program of calling the Open_FCW Protocol Procedure (block 131/231, FIG. 5B). Next, the complete name of the NT Server DLL is passed in an ASCII null terminated string to the Open FCW Protocol Procedure (block 132/232, FIG. 5C). Entry into the Open FCW Protocol Procedure transfers control to the NT operating system (block 133/233, FIG. 5C).

Figure 5B:
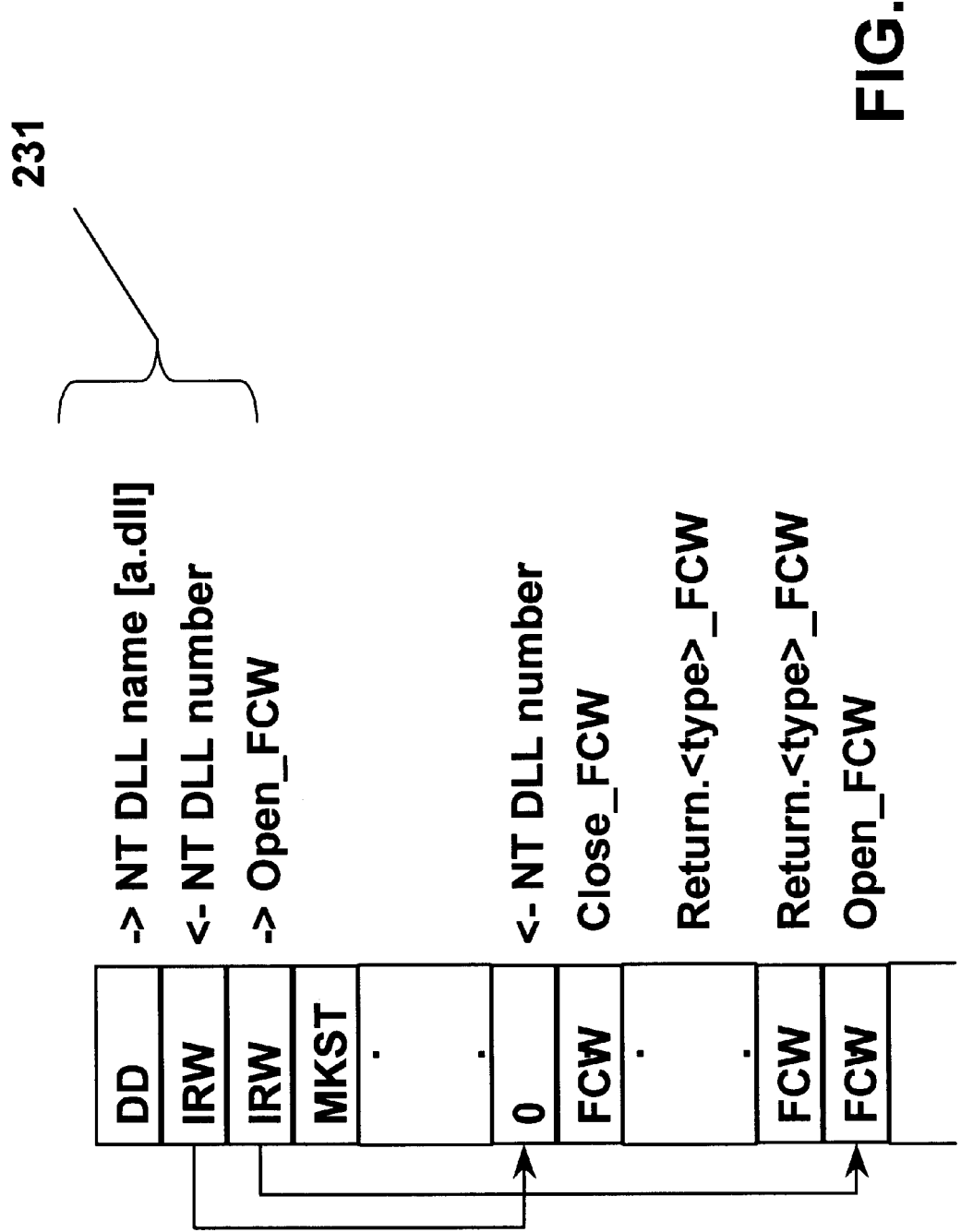
FIGS. 5A through 5W (intentionally excluding the letters O and I so as to avoid confusion) combined form a detailed sequence diagram illustrating operation of the method of the present invention.
Figure 5C:
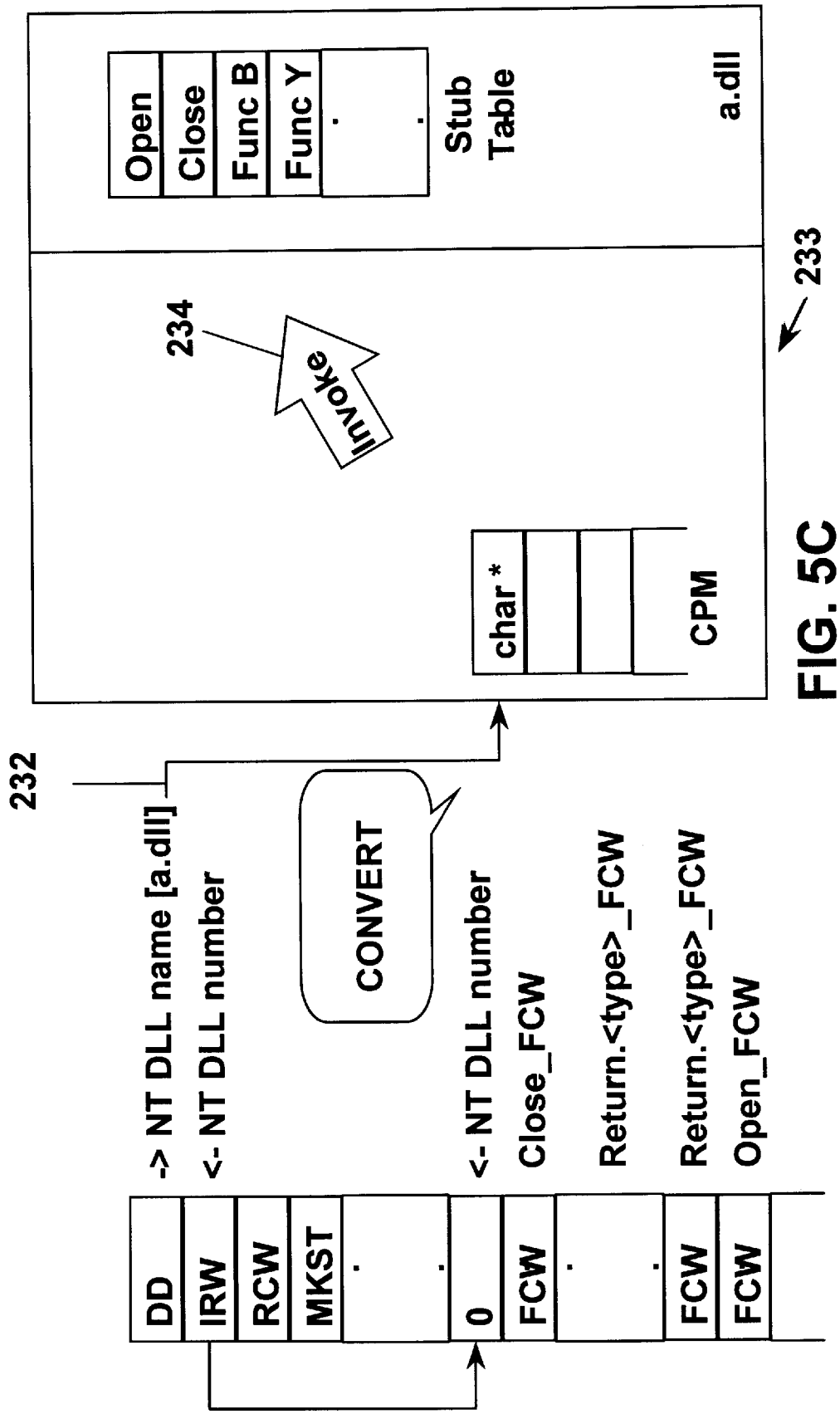
Figure 5D:
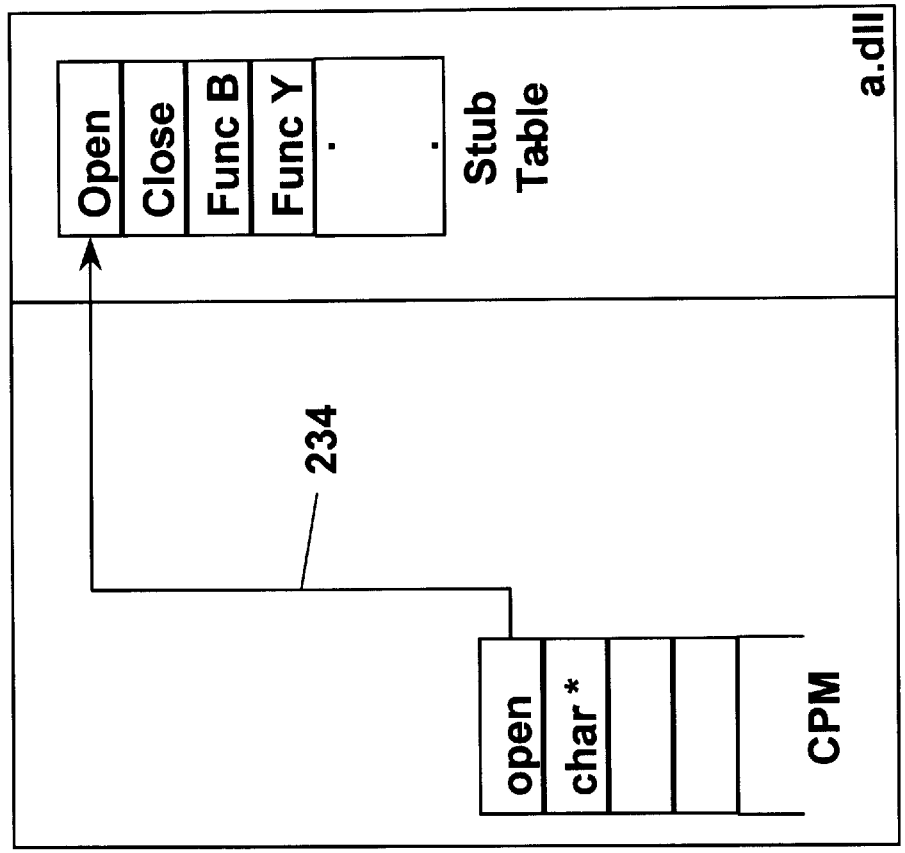
Figure 5D:
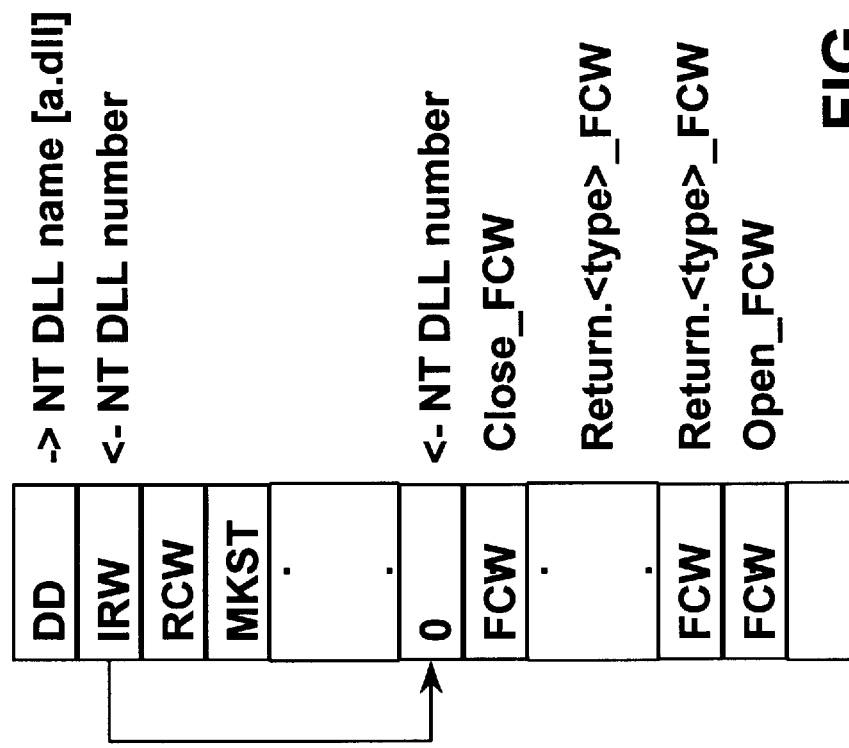

The NT Operating System attempts to initiate the NT Server DLL identified in the passed parameter (block 134/234, FIGS. 5C and 5D). Next, an inquiry is made as to whether or not the initiation by NT was successful (diamond 135/235, FIG. 5E). If the answer to this question is yes, then NT assigns an identifying number to the DLL, stores it in the DLL_Number parameter to the Open_FCW Protocol Procedure and leaves a value of zero (0) on top of the MCP stack (block 136/236, FIG. 5G). On the other hand, if the initiation by the NT was not successful, it leaves a value of one (1) on the top of the MCP stack (block 137).

The zero (0) or one (1) will be used as a result by the Client Program to indicate success or failure of the attempt to initiate the NT Server DLL. The Client Program may act upon such indications, or ignore them, as determined by the programmer. In the case of failure, further execution of external procedure calls by the Client Program is not possible (although it can continue performing other functions). The Client Program can take any appropriate action, such as correcting the name of the NT Server DLL or perhaps terminating.

Following the step 137, control is returned to MCP wherein the CPU 114 cuts the Client Program stack back to the activation record below the Open_FCW Procedure (block 138 stack space 238 vacated, FIG. 5G). Since the initiation was unsuccessful, the Client Program may not make function calls to the Server Program (block 139). The Client Program performs other processing, possibly making subsequent calls to the initialization function (block 140). At this juncture the process continues at a connector B in FIG. 4D, which will be amplified further hereinafter (bubble 141).

Figure 4B:
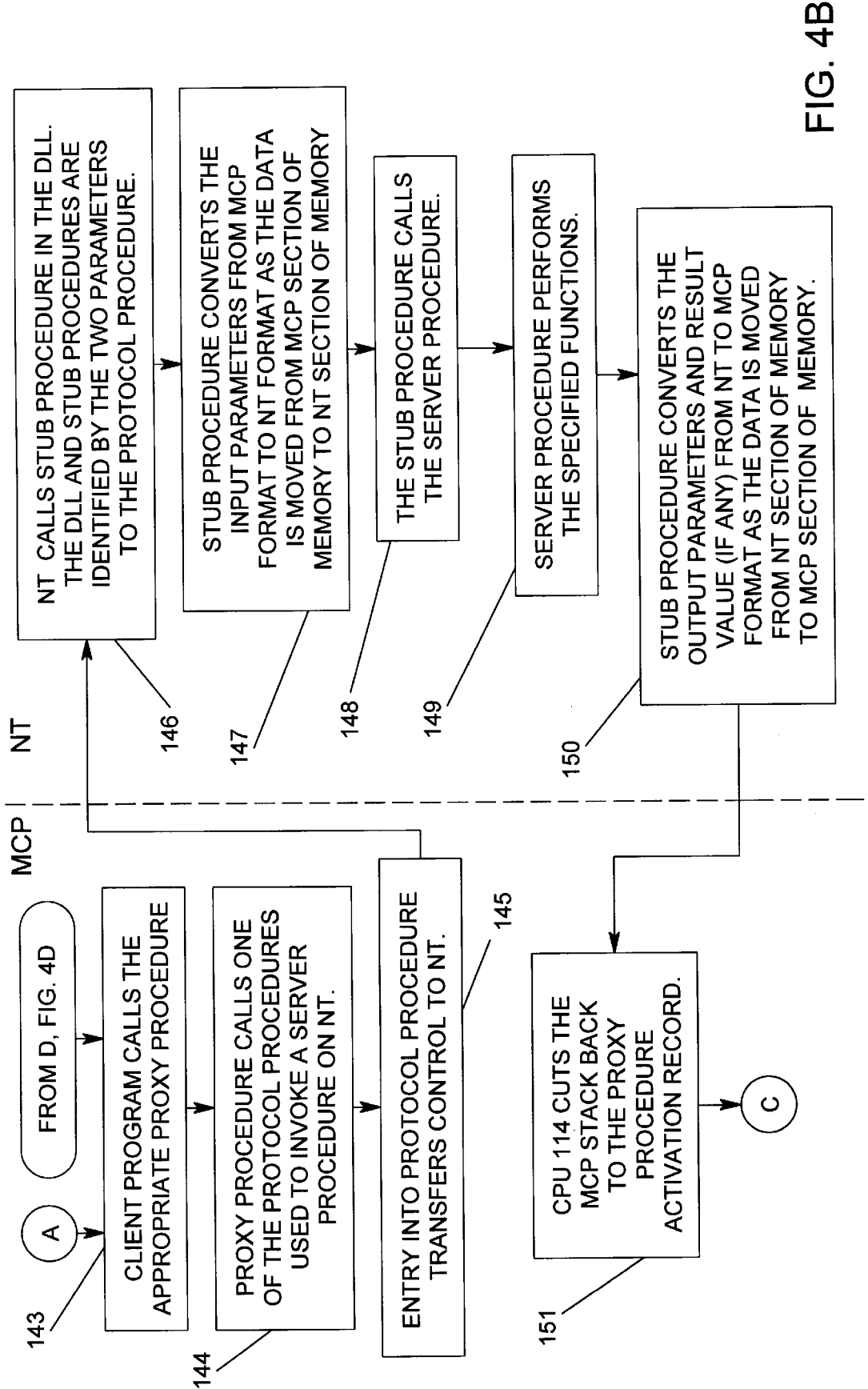
Figure 5E:
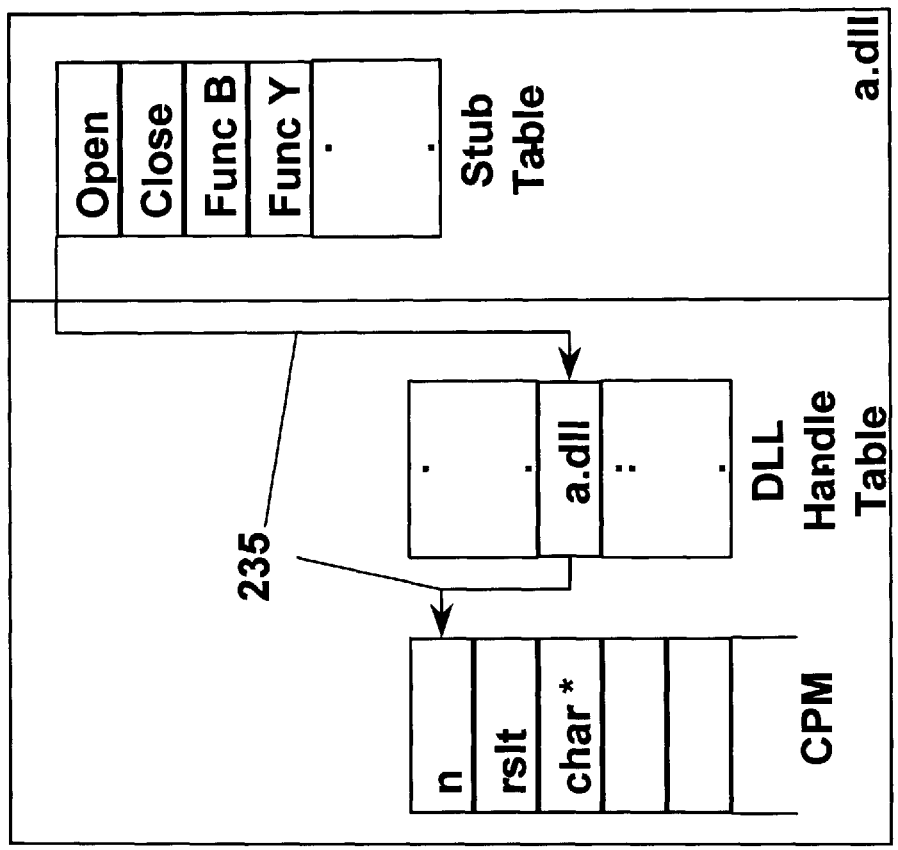
Figure 5E:
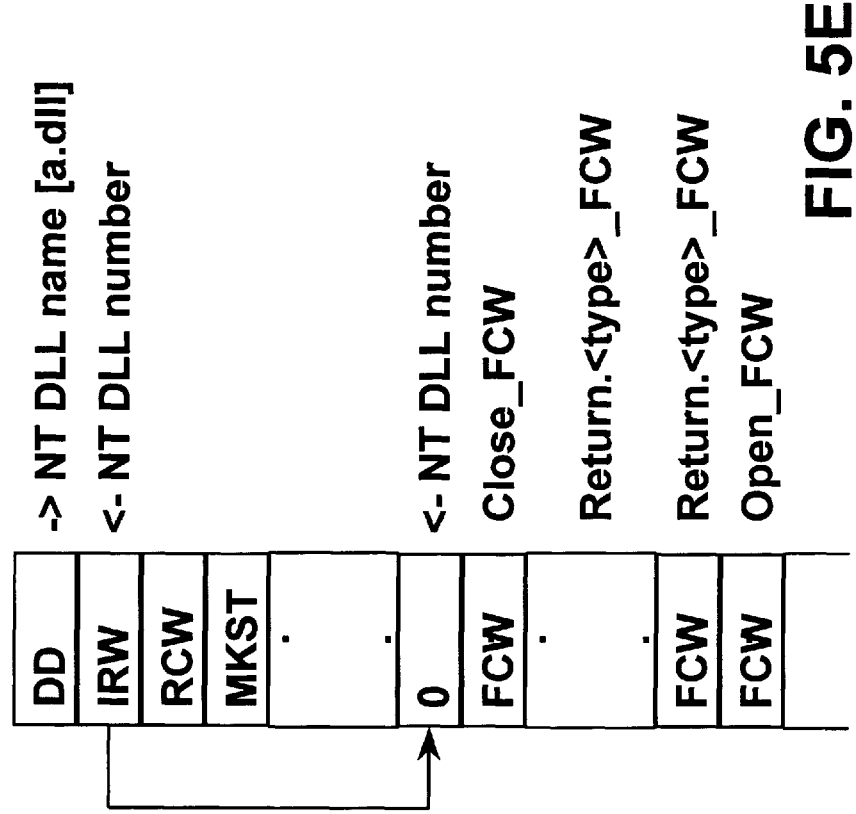
Figure 5F:
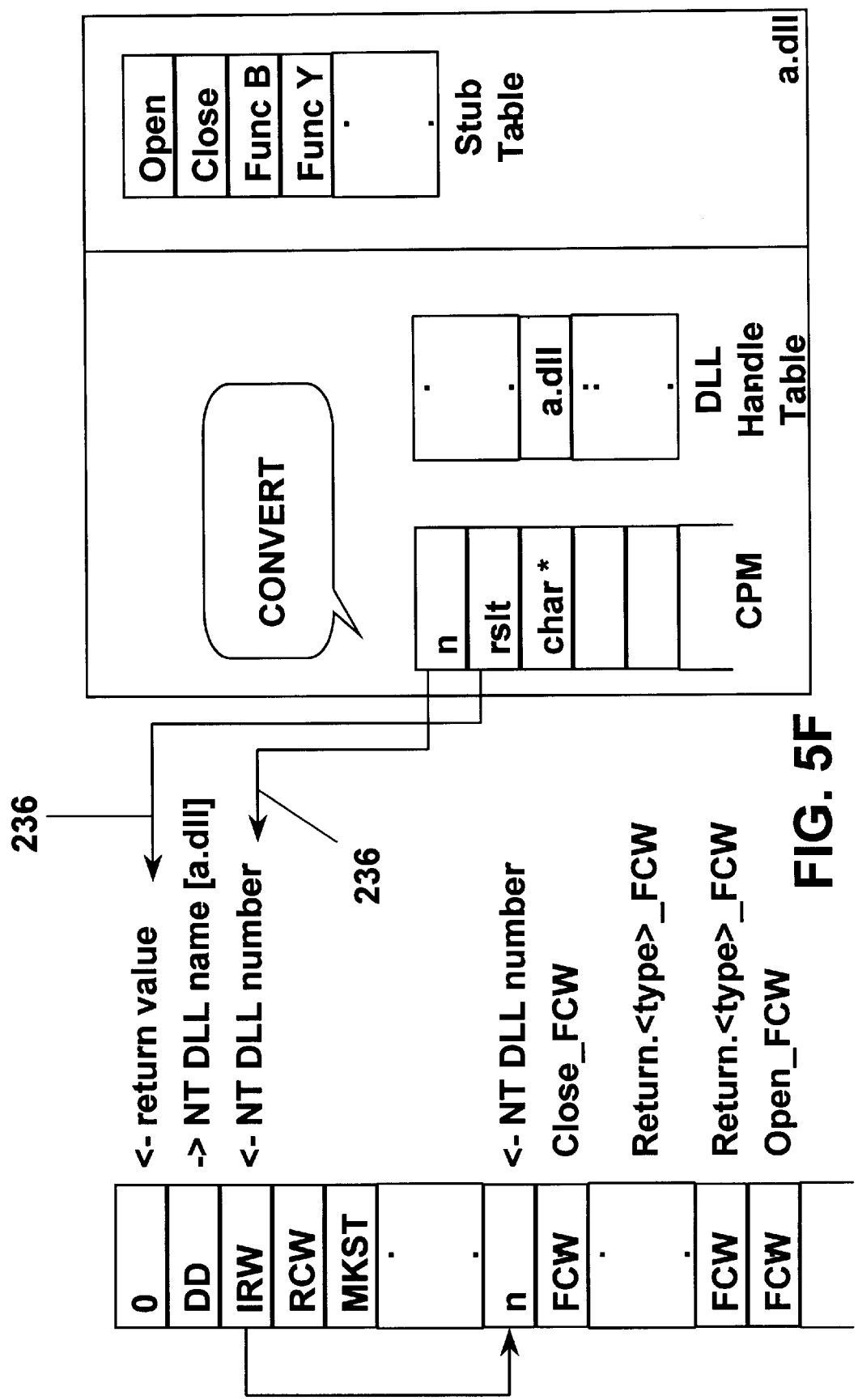
Figure 5G:
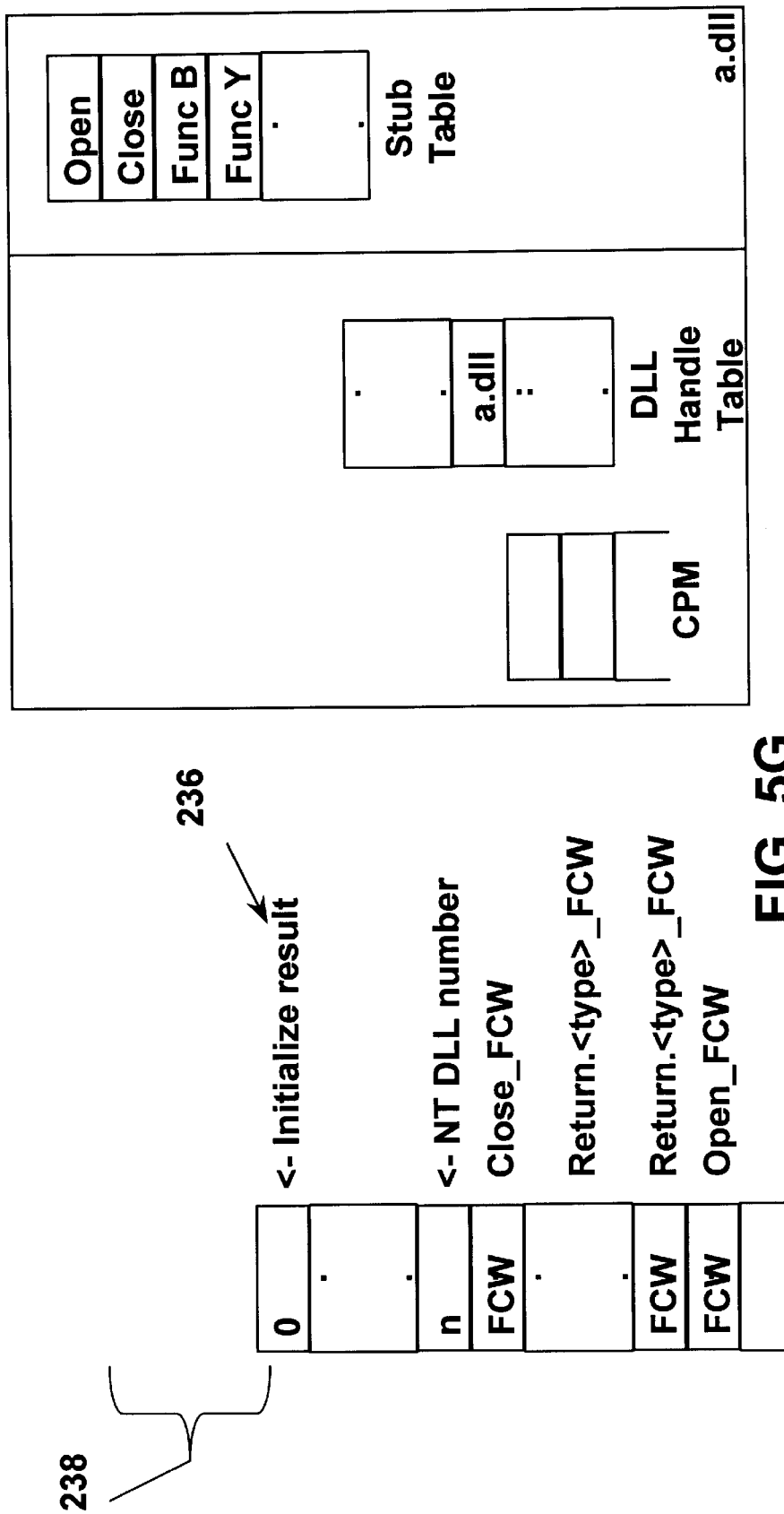
Figure 5H:
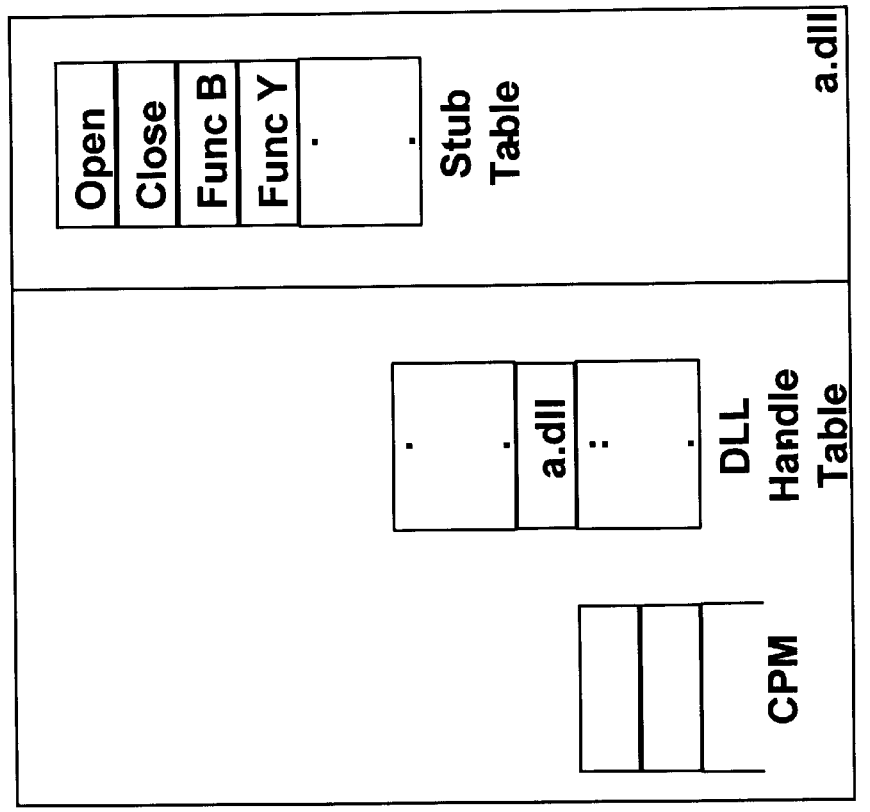
Figure 5H:
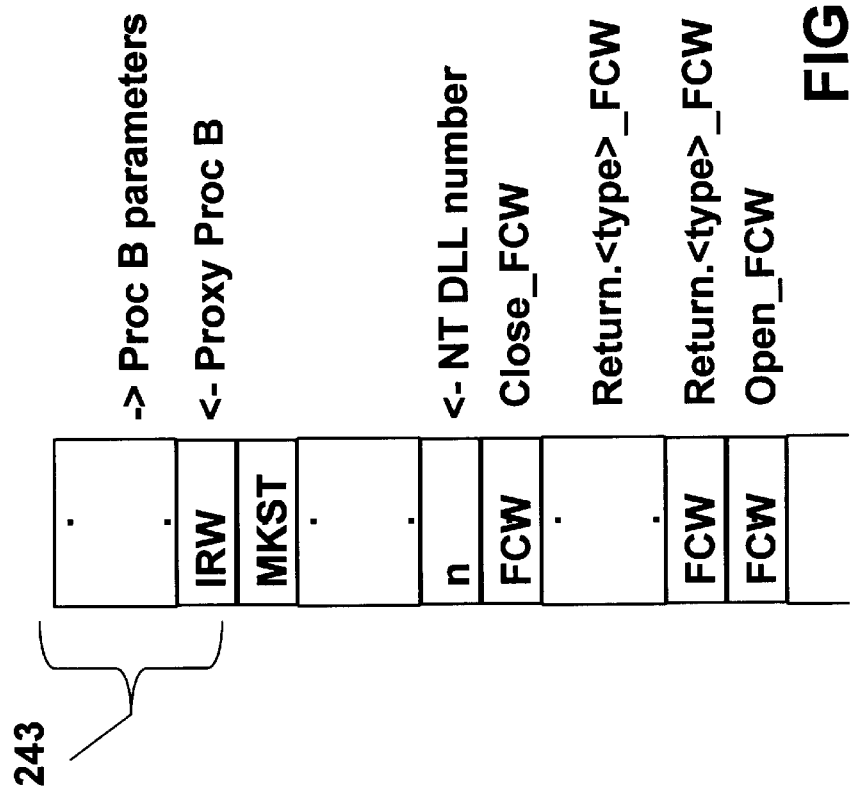
Figure 5J:
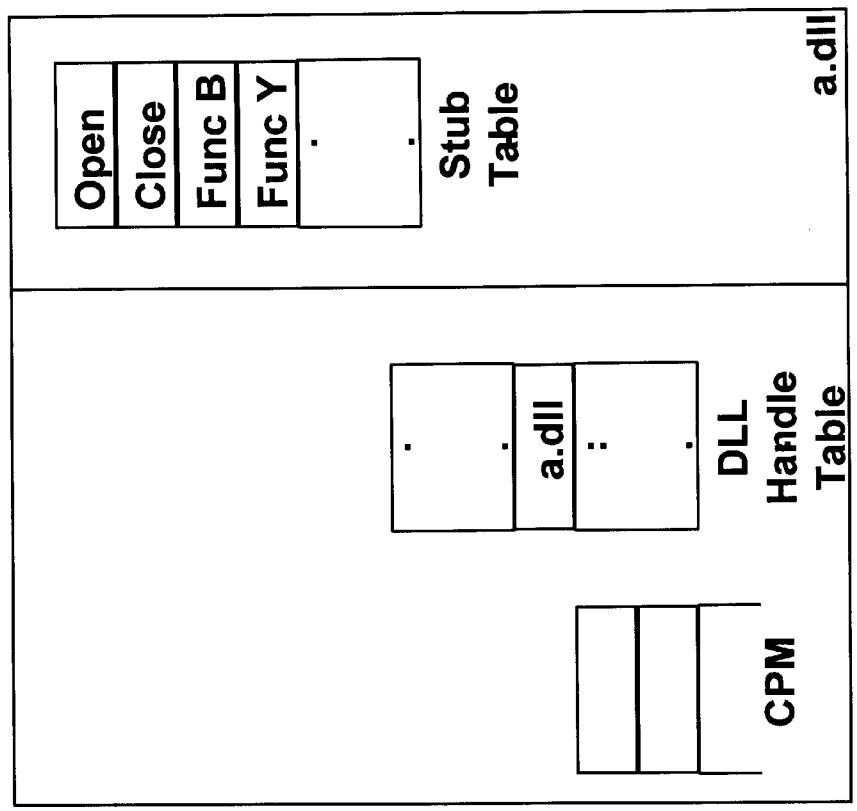
Figure 5J:
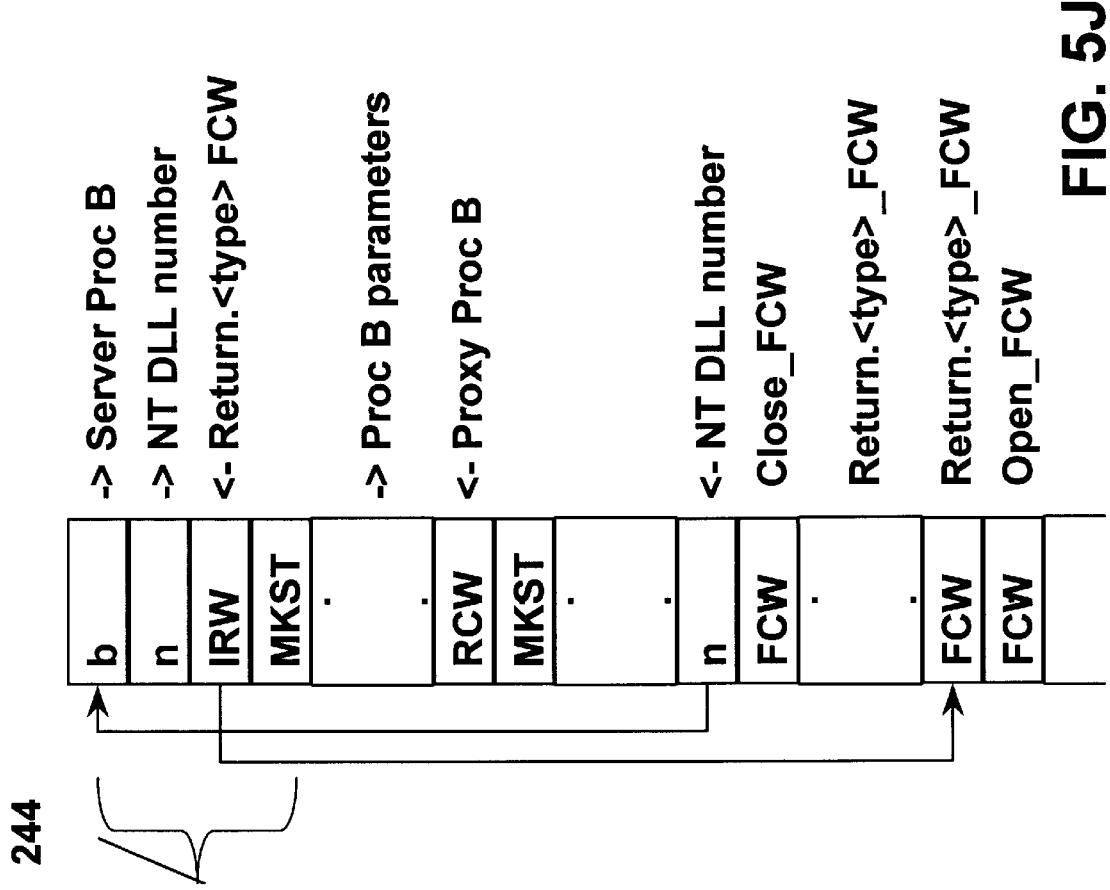
Figure 5K:
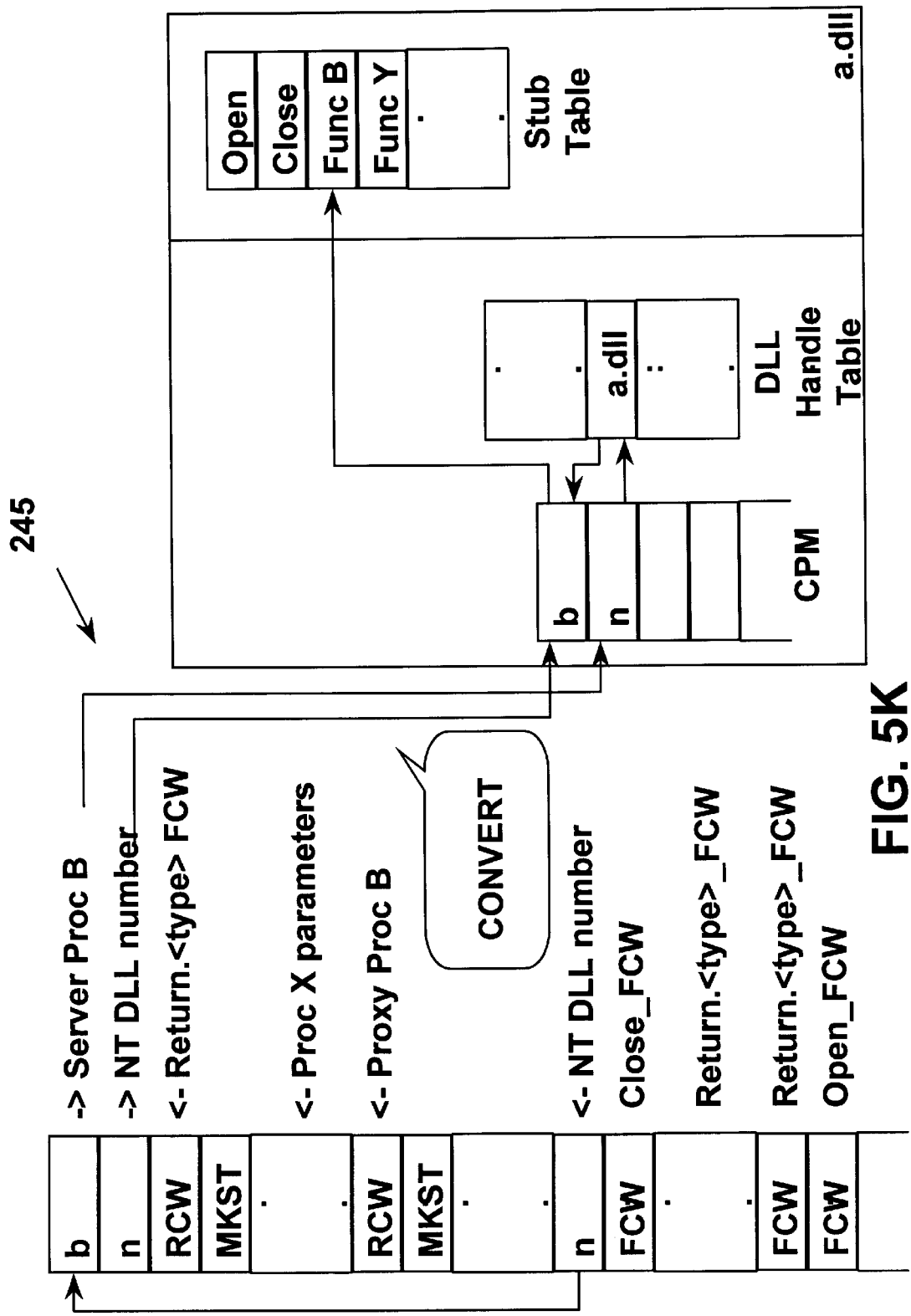
Figure 5L:
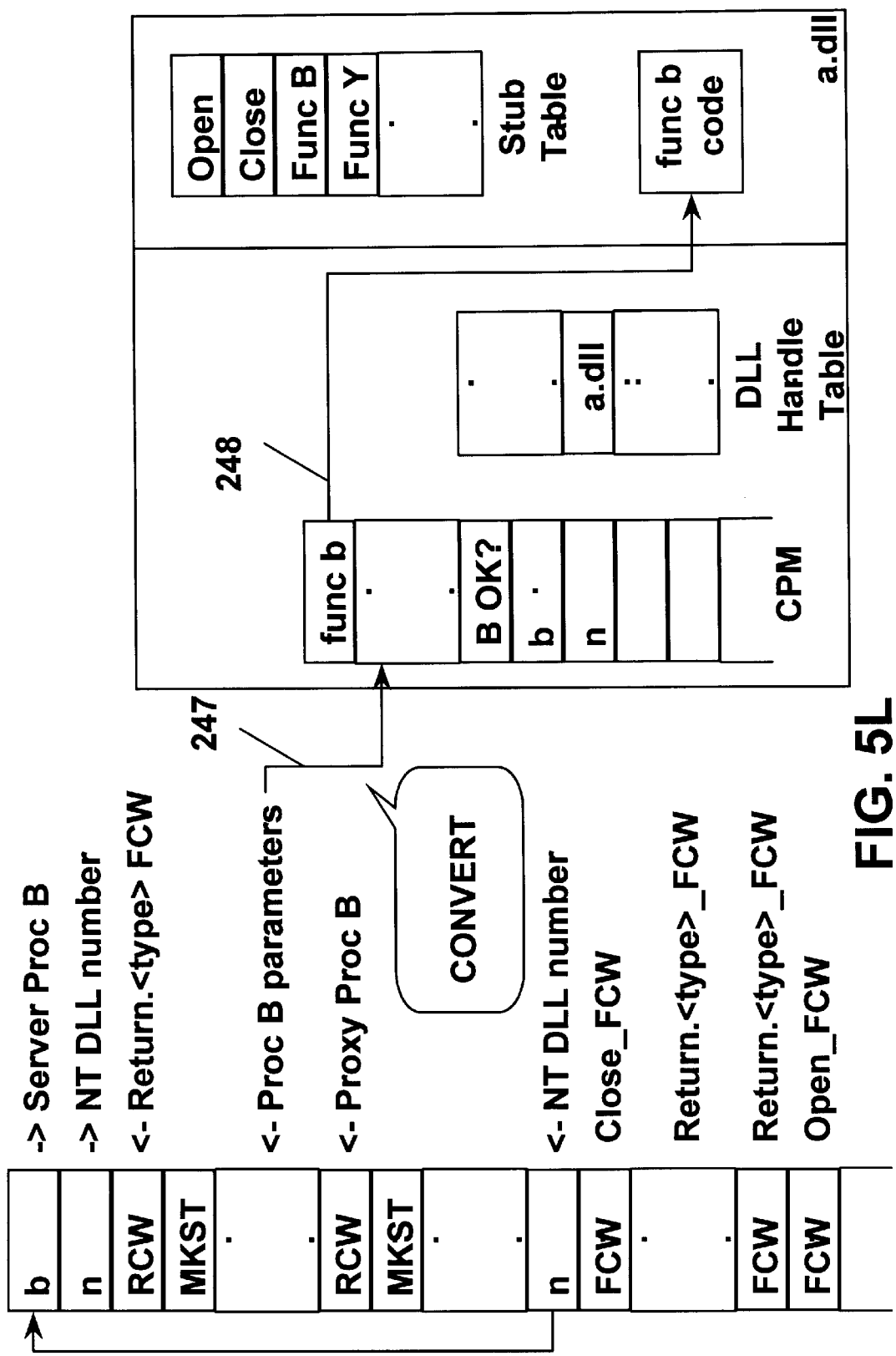
Figure 5M:
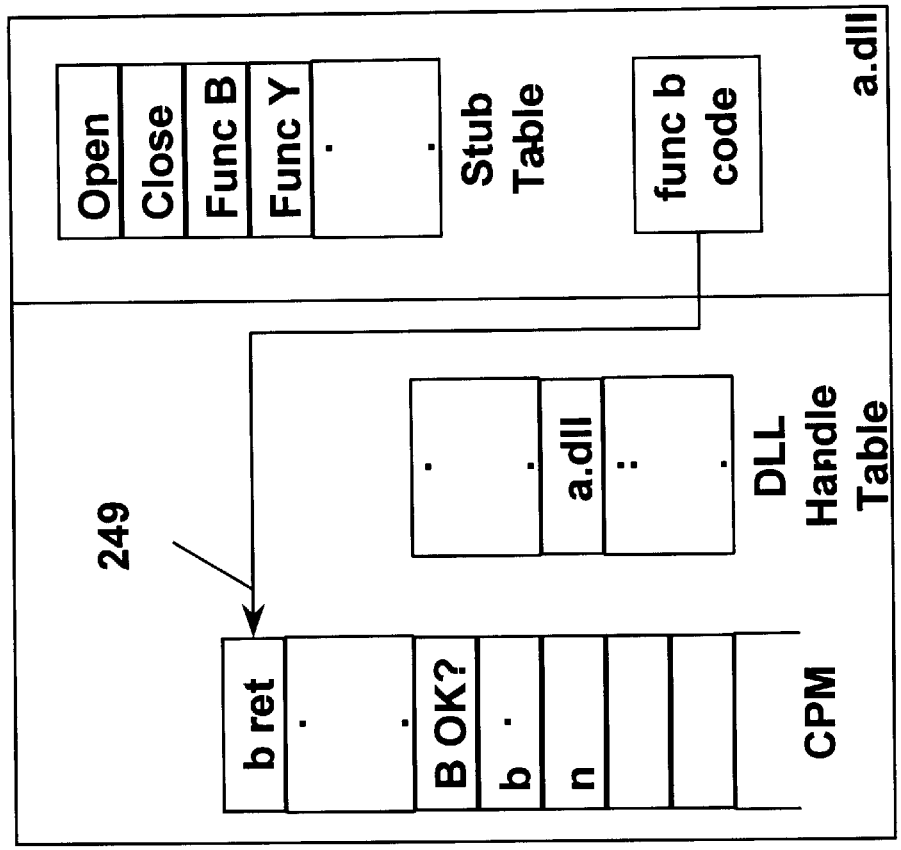
Figure 5M:
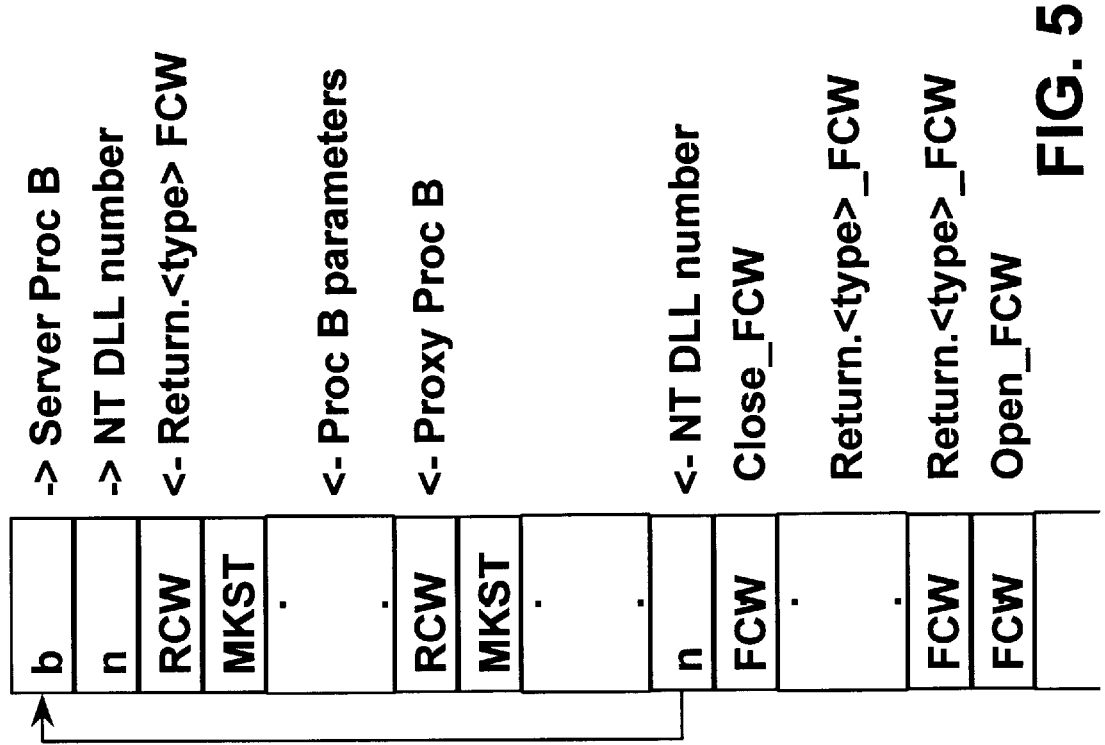
Figure 5N:
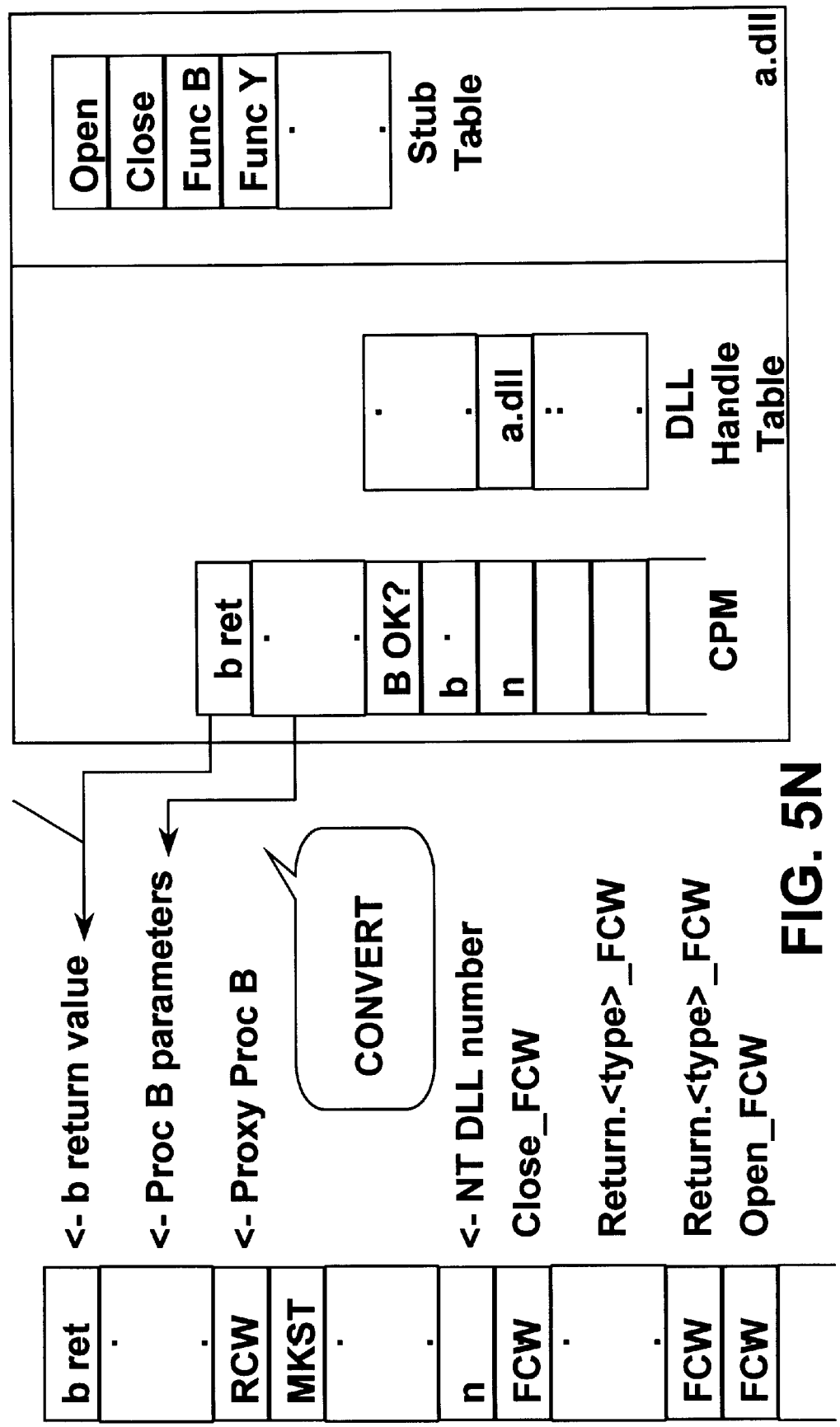
Figure 5P:
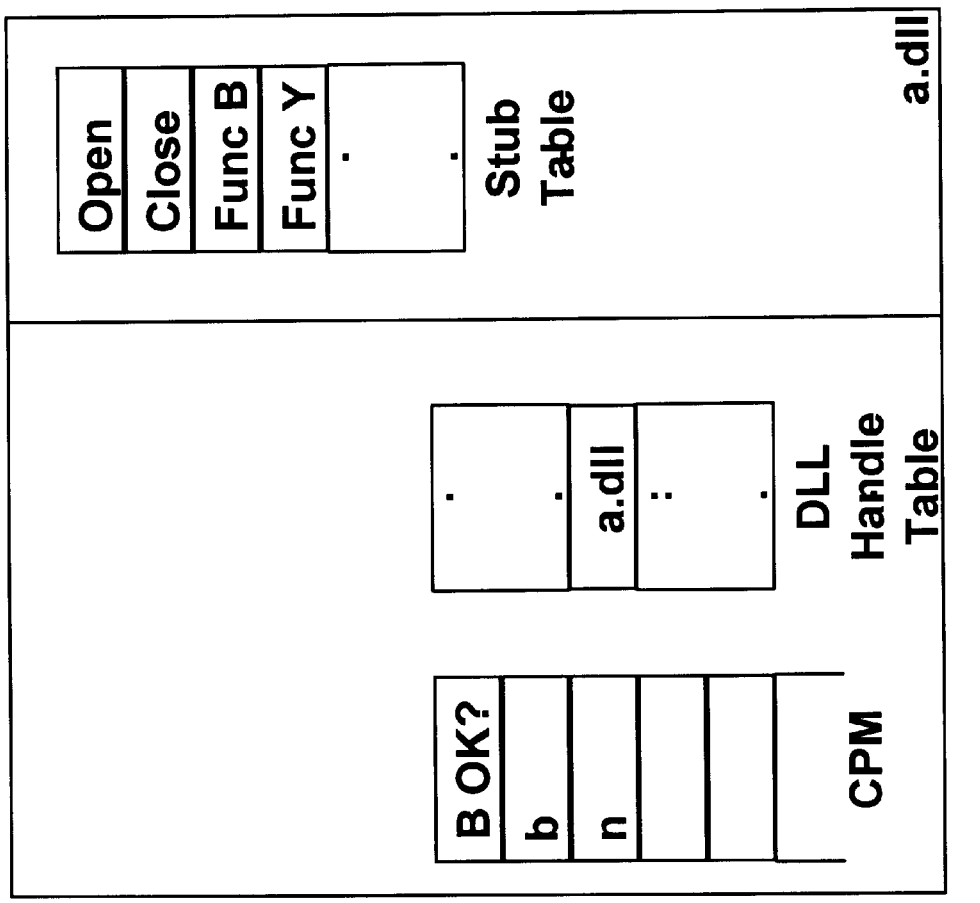
Figure 5P:
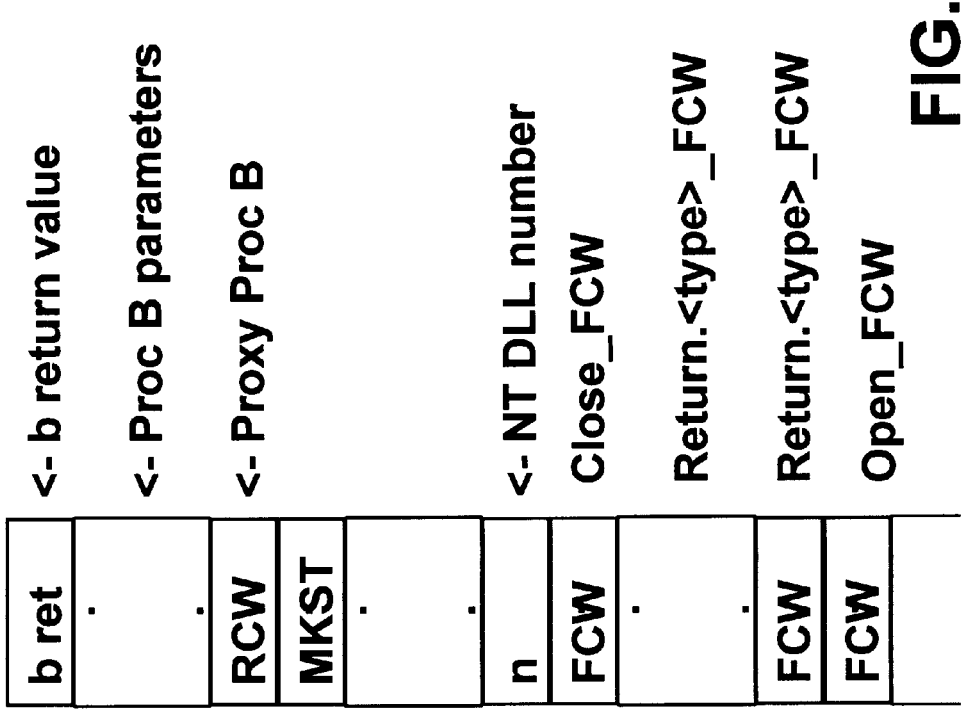
Figure 5Q:
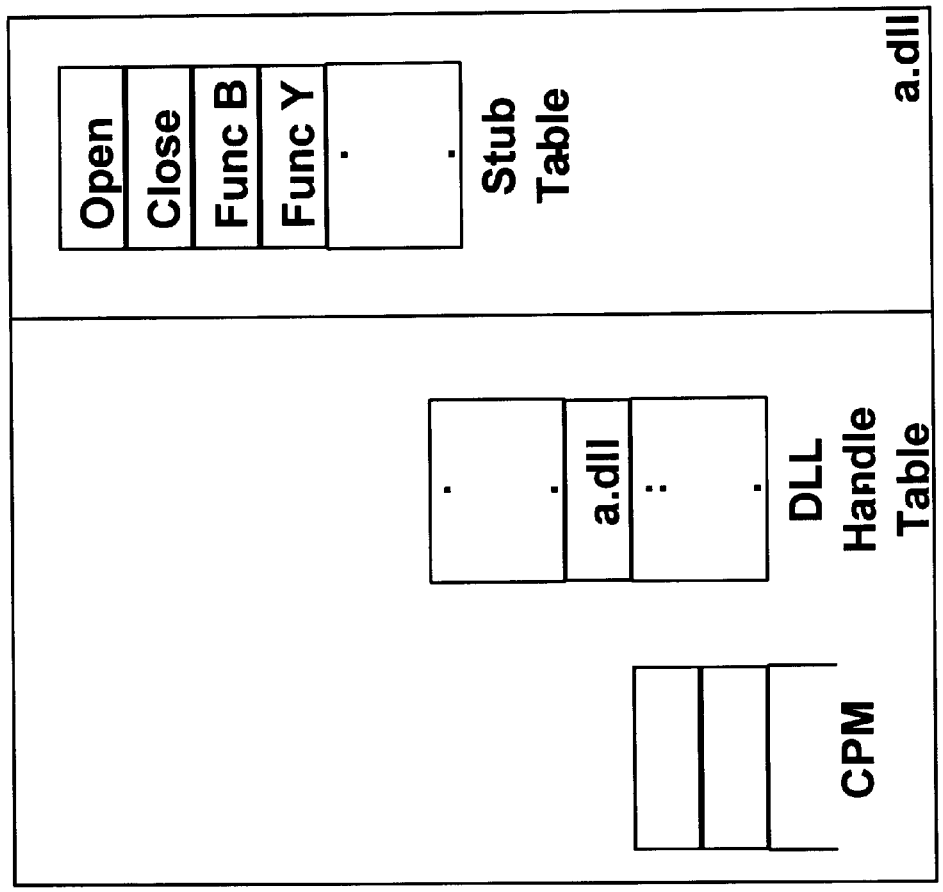
Figure 5Q:
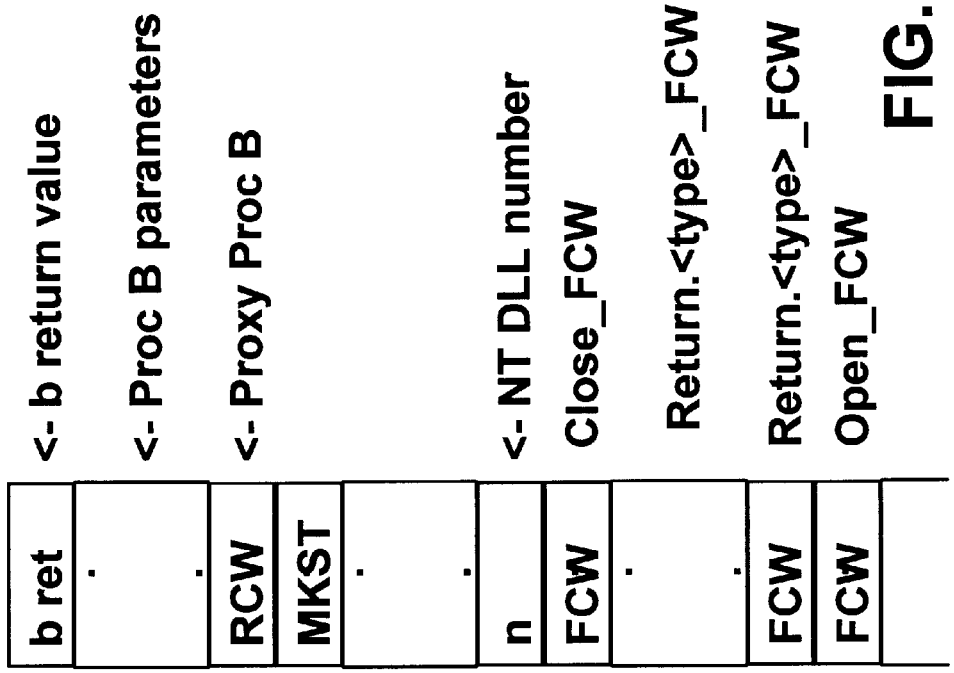
Figure 5R:
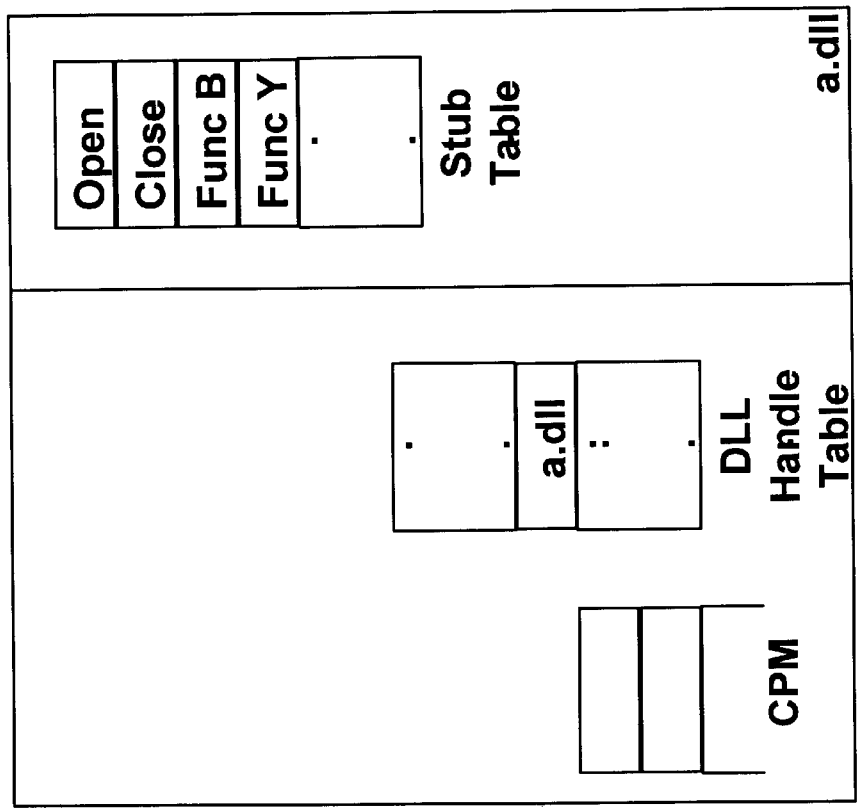
Figure 5R:
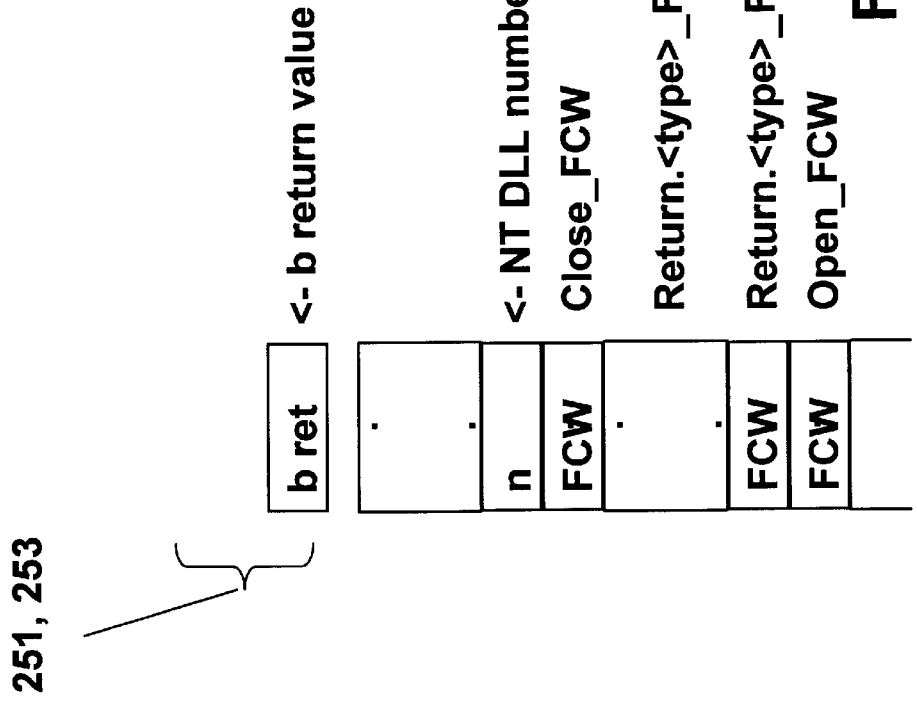
Figure 5S:
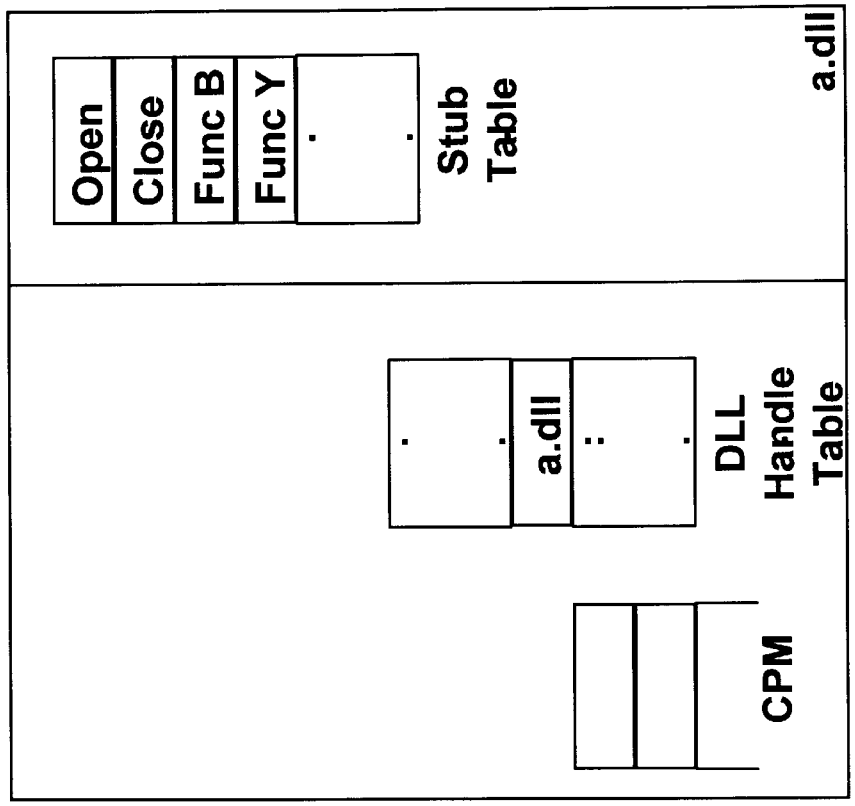
Figure 5S:
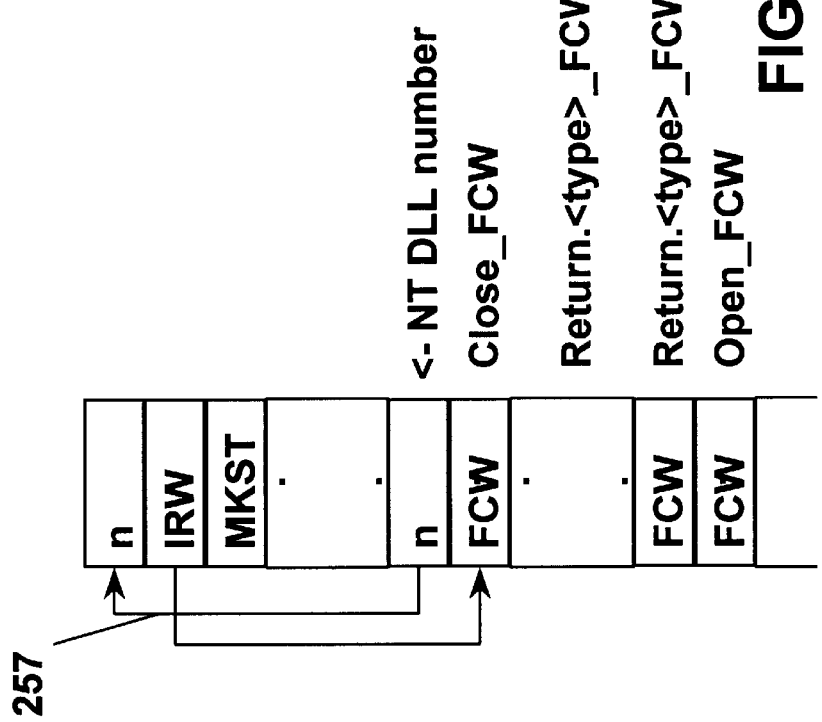
Figure 5T:
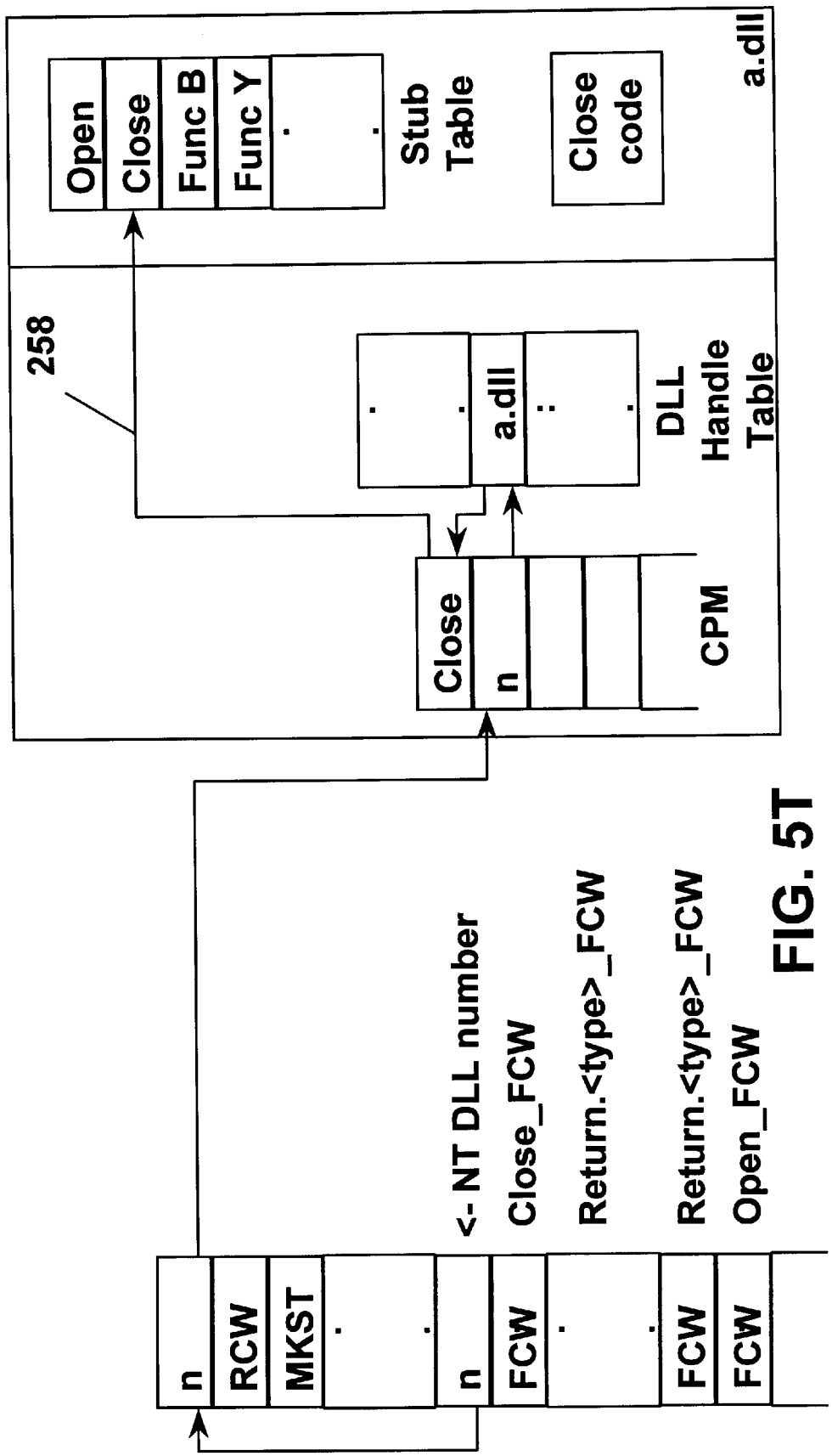
Figure 5U:
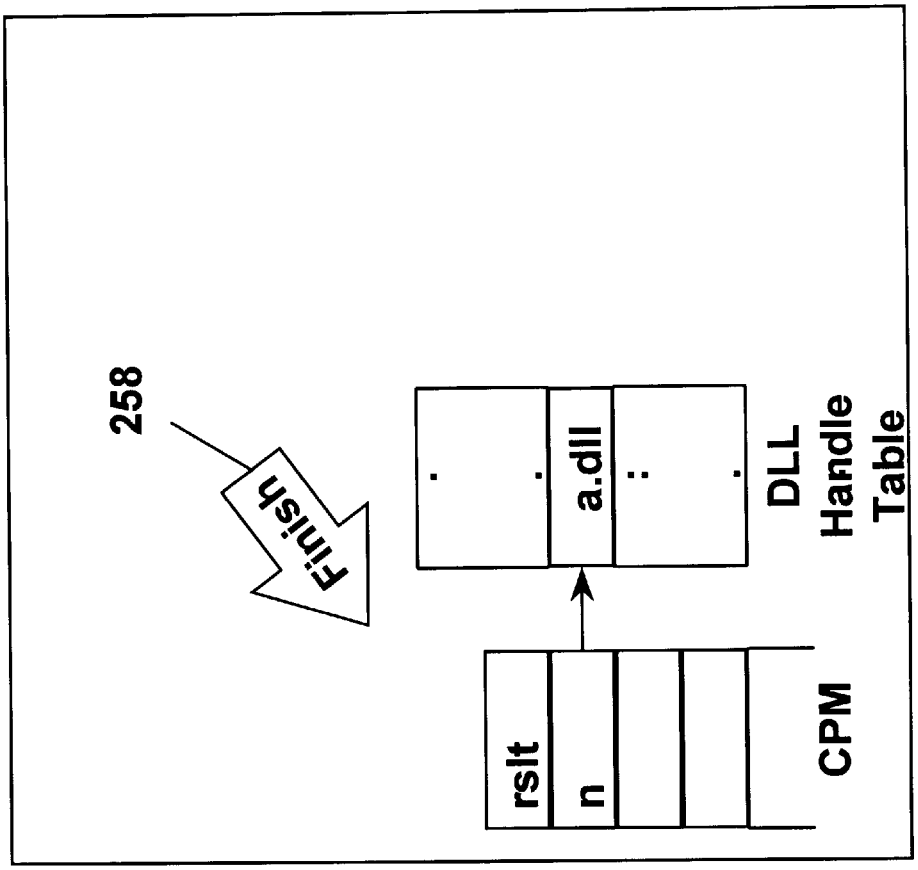
Figure 5U:
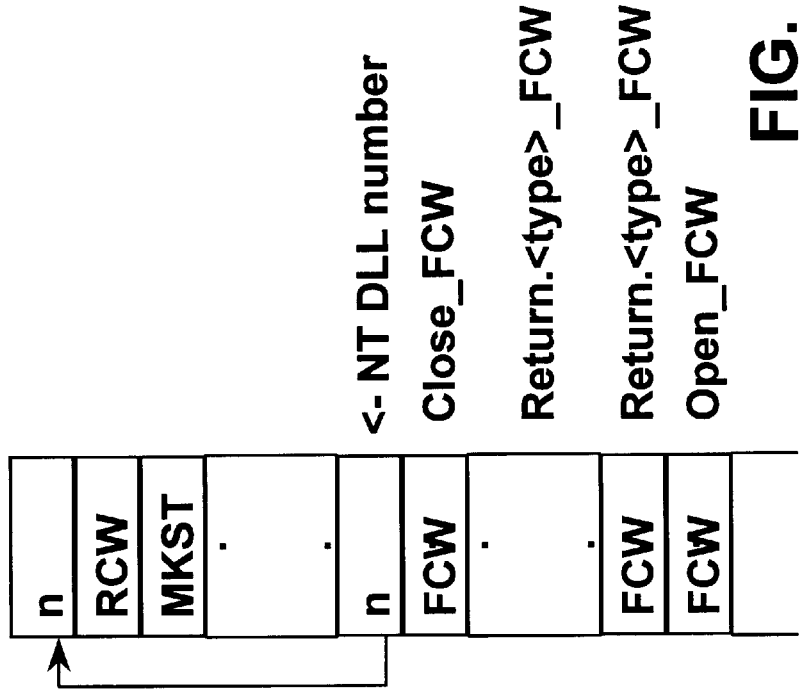
Figure 5V:
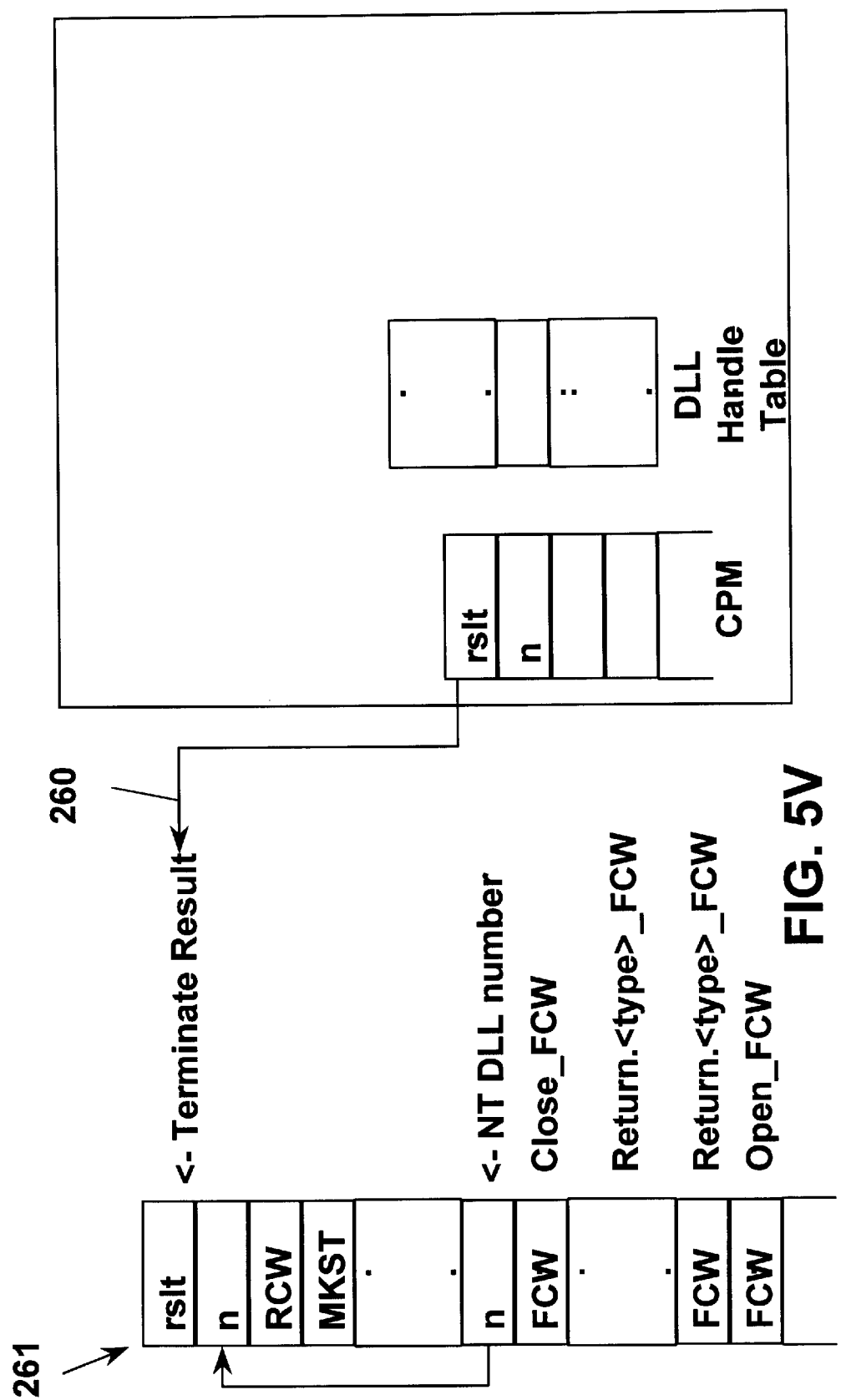
Figure 5W:
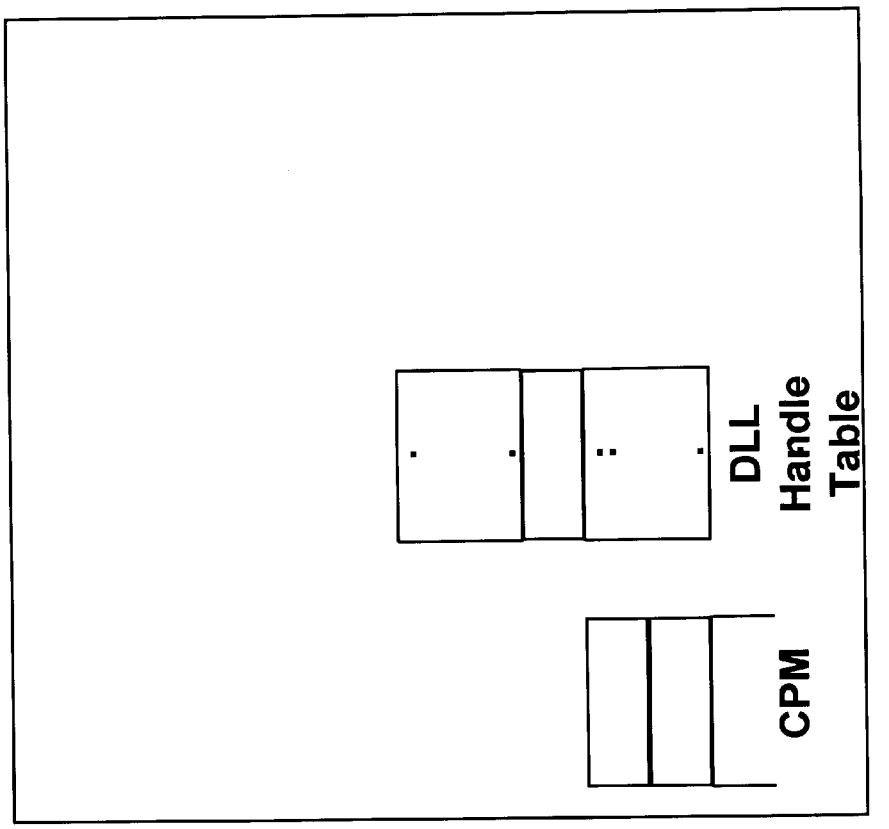
Figure 5W:
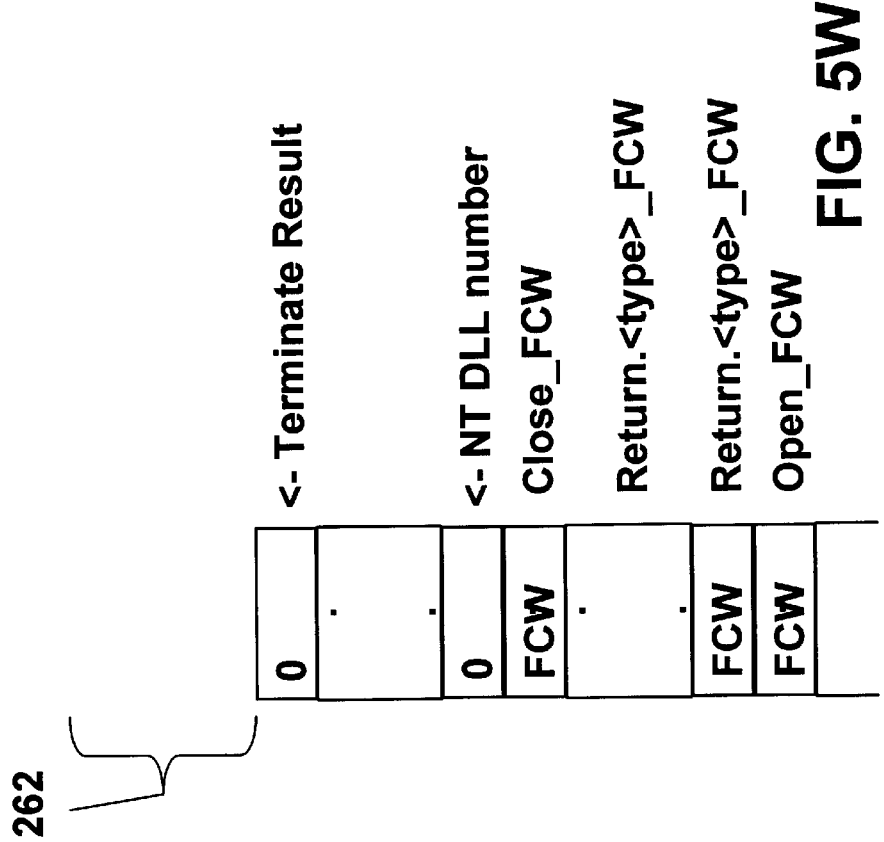

If the NT Server DLL initiation was successful, the External Procedure Calls are now initialized and the Client Program may begin calling NT Server Program Functions, as described further in combination with FIG. 4B at a connector A and FIGS. 5 through 5W.

Referring now to FIG. 4B at the connector A, and to FIG. 5H, the Client Program invokes an NT Server Program 106 DLL Function by calling the appropriate Proxy Procedure (block 143/243, FIG. 5H). The Proxy Procedure then calls one of the Protocol procedures used to invoke a Server procedure on the NT operating system (block 144/244, FIG. 5J). Entry into the Protocol Procedure transfers control to the NT Operating System (block 145/245, FIG. 5K). NT calls the indicated Stub Procedure in the NT Server Program DLL. The indicated Stub Procedure is identified by the two parameters to the Protocol Procedure (block 146/246, FIG. 5K). Next, the Stub Procedure converts the input parameters from MCP format to NT format as the data is moved from the MCP section of the memory 118 to NT memory section of the memory (block 147/247, FIG. 5L).

Following this, the Stub Procedure calls the actual Server Procedure (block 148/248, FIG. 5L), and the Server Procedure performs the specified functions (block 149/249, FIG. 5L), possibly returning a result. The Stub Procedure then converts the output parameters, and any result values, from NT format to MCP format as the data is moved from the NT section of the memory 118 to the MCP section of the memory (block 150/250, FIG. 5N) Within the MCP operating system the CPU 114 cuts the Client Program stack back to the Proxy Procedure activation record (block 151/251, FIG. 5K). After this, the Client Program Proxy Procedure resumes execution. The flow chart continues in FIG. 4C as depicted by a connector C.

Figure 4C:
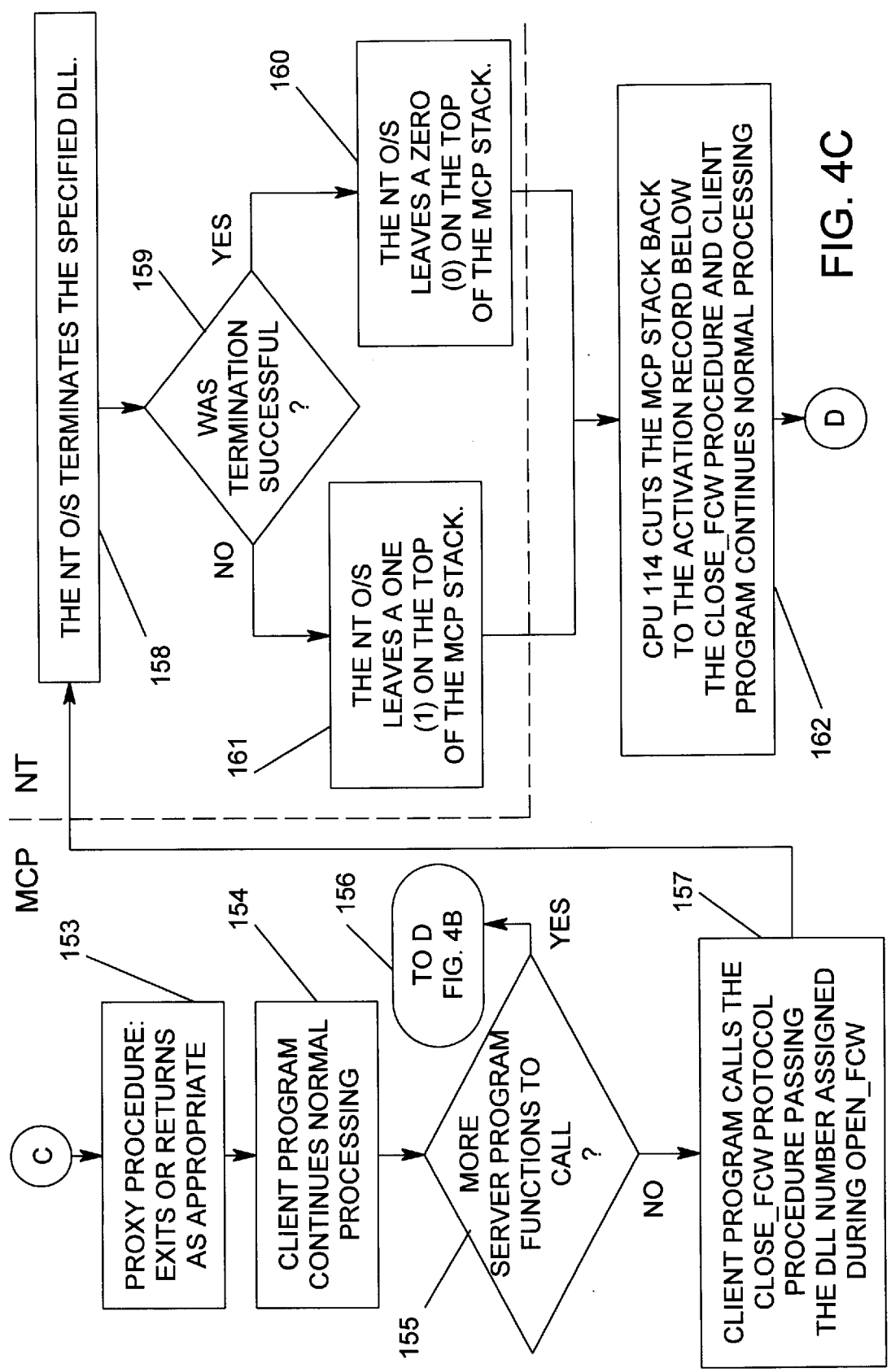

Referring now to FIG. 4C at the connector C, within MCP the Proxy Procedure exits or returns as appropriate (block 153/253, FIG. 5R). Next, the Client Program continues normal processing (block 154). Such normal processing of programs may occur for quite some time, and may not involve the External Procedure Call program hereof, before an additional call is made for another Server Program function. At such time, an inquiry is then made as to whether or not there are more Server Program Functions to call (diamond 155). If the answer to this inquiry is yes then a return is taken back to the step depicted by the block 139 (FIG. 4A) as denoted by a connector D (bubble 156). On the other hand, if the answer to this inquiry is no, when the Client Program has no further use for any NT Server DLL Functions from this Server Program, the Client Program then calls the Close_FCW Protocol Procedure passing thereto the DLL number assigned during Open_FCW (block 157/257, FIG. 5S).

In response to receipt of the call for Close_FCW Protocol and the passing of the DLL number therefor, NT terminates the specified DLL (block 158/258, FIGS. 5T and 5U). Next, an inquiry is made as to whether or not the termination was successful (diamond 159). If the answer to this inquiry is yes, then the NT Operating System leaves a zero (0) on top of the Client Program MCP stack (block 160/260, FIG. 5V). On the other hand, if the termination was not successful, then the NT Operating System leaves a one (1) on top of the Client Program MCP stack (block 161). Following either step 160 or step 161 and within the MCP, Operating System, the CPU 114 cuts the MCP stack back to the activation record below the Close_FCW procedure and continues with normal processing (block 162 stack space 262 vacated, FIG. 5W) The Client Program can then use the 0 or 1 return value left on the top of the stack as a determination of whether or not the NT Server DLL termination was successful. The process continues in FIG. 4C at a connector D.

Figure 4D:
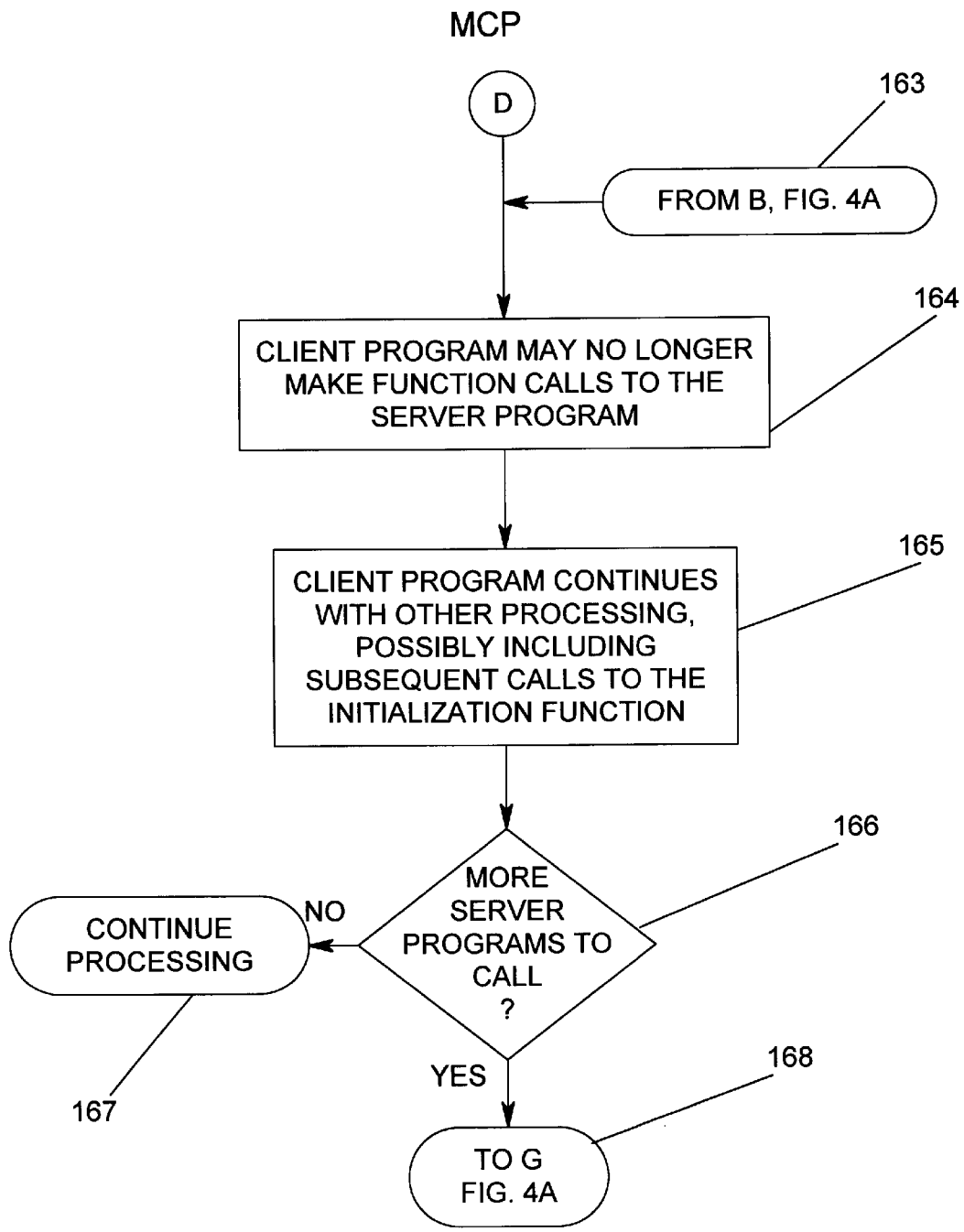

Referring now to FIG. 4D at the connector D, the Client Program may no longer make function calls to the Server Program since the specified DLL was terminated. The Client Program thus continues with other processing, possibly including subsequent calls to the initialization function (block 165). This continuation of other processing of programs may occur for quite some time, and may not involve the External Procedure Call program hereof, before an additional call is made for another Server Program. It is noted that such a call to another Server Program could be to the Server Program 106 or to an entirely separate server program that shares the same common memory 118. At such time, an inquiry is next made as to whether or not there are more Server Programs to call (diamond 157). If the answer to this inquiry is yes, then a branch is taken back to the step depicted by the block 131 in FIG. 4A at a connector G (bubble 168 and FIG. 5B) for the beginning anew of the entire process. On the other hand, if the answer to this inquiry is no, then the Client Program continues with any other normal processing (bubble 167).

Referring now to FIGS. 5A through 5W (intentionally excluding reference letters O and I so as to avoid confusion), the individual steps of the method of the present invention are illustrated graphically. It should be noted that them diagrams in the FIGS. 5A through 5W represent parts of the Programs stored in the memory 118. However, FIGS. 5A and 5B illustrate only the MCP Procedure Call Stack stored in the memory 118 during the beginning stages of the process, whereas the remaining FIGS. 5C through 5W are divided in a similar manner to that used for FIGS. 4A through FIG.4D. That is, the MCP operating system is on the left-hand side of each sheet and the Windows NT operating system is on the right-hand side of each sheet. With reference to FIG. 5E for example, the memory section 200 depicts the Windows NT section of the memory 118. More particularly, this section of the memory is further divided into an NT Procedure Call Stack 201, a DLL Handle Table 202 and a Stub Procedure Table 203.

At this juncture of the description it is noted that the designations of Client Program in the O/S I, or Server Program in the O/S II is determined by which program makes a call to an initialization Generated Function. The program that makes such a call is designated the Client Program, and the other program is designated the Server Program. The designation is transient, and only applicable during the duration of each step of the above-described process. Either program may be both a Client Program and a Server Program at different times, as determined by the functions declared in the Interface Definition Language. In this way, it is possible for a program in the O/S I to call functions resident in a program in the O/S II, and for the same program in the O/S II to call functions resident in the program in the O/S I. That is, the programs may alternate the roles of Client Program and Server Program.

Further, these role reversals may be interleaved. That is, a program acting as a Server Program may begin acting as a Client Program, while still in the role of a Server Program. This process is known as callbacks in External Procedure Calls, and occurs when a called server function (while processing) calls a function resident in the original program that called the server function. Further, these call-back functions may be nested. That is, a program acting as a Client Program, and then acting as a Server Program during the scope of the Client Program call, may then act again as a Client Program during the scope of the server function execution. In this way, function calls may proceed back and forth between the programs, each building on the other, to an arbitrary depth. When calls are made in this fashion, most recently invoked functions are always completed and exited prior to any earlier invoked functions being completed. That is, functions are completed in a last-invoked first-completed fashion.

Although the process described hereinabove depicts exactly two programs (one Client Program, and one Server Program), there is no restriction that the roles of Client Program and Server Program always be taken by the same physical programs. That is, a Server Program may initiate a callback function to another program that is not the same program, but is acting as a Client Program. There is no limit on the number of different physical programs that may be involved in the above-described calling sequences.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. In a heterogeneous computer system having at least two CPUs and a common memory completely accessible by at least one of said CPUs and being disposed for storing at least two different operating systems that actively run and control resources of said heterogeneous computer system, a method for performing function calls from a Client Program stored in said common memory and being executed by a first one of said CPU's under control of a first of said two operating systems to a Server Program operating stored in said common memory and being executed by a second one of said CPU's under control of a second one of said two operating systems, said method comprising the steps of:
   a. said Client Program initiating said Server Program by sending initialization signals to said Server Program via a CPU-to-CPU signal bus between said at least two CPS'S;
   b. after successfully initiating said Server Program, said Client Program storing parameters in a Client program stack stored in said common memory;
   c. said Server Program fetching said parameters directly from said Client program stack;
   d. a stub procedure within said Server Program converting said parameters from a format compatible with said first operating system to a format compatible with said second operating system;
   e. said Server Program processing said parameters according to said specific function;
   f. said Server Program converting results of the preceding step (if any) from a format compatible with said second operating system back to a format compatible with said first operating system;

g. said Server Program storing in a Server program stack within said common memory said results converted in the previous step; and, h. said Client Program fetching said results from said Server program stack in said common memory.

2. The method as in claim 1 wherein said step of initiating said Server Program further includes said Client program calling a protocol procedure and passing thereto an identification of said Server Program.

3. The method as in claim 2 wherein said step of initiating further includes indicating to said Client Program if said Server program fails to respond to an attempt to initiate operation thereof.

4. The method as in claim 3 further including said Client program continuing with processing without accessing said Server Program.

5. The method as in claim 1 further including the step of said Client Program suspending operation while awaiting an indication that processing of said parameters has been completed.

6. The method as in claim 5 wherein said step of converting results further includes said protocol procedure calling a stub procedure for performing the step of converting said results.

7. The method as in claim 1 wherein step c thereof further including the step of calling a proxy procedure for the fetching of said parameters from said Client program stack.

8. The method as in claim 7 further including said proxy procedure calling a protocol procedure for invoking said Server Program to perform said specific function with said parameters.

9. A method as in claim 1 further including the step of repeating steps b through h for each occurrence that said first program makes calls to said second program to perform a specific function.

10. The method as in claim 1 and following step f thereof, further including the step of terminating operation of said Server Program if there are no more pending calls thereto.

11. In a heterogeneous computer system having at least two CPU's and a common memory completely accessible by at least one of said CPUs and being disposed for storing at least two different operating systems that actively run and control resources of said heterogeneous computer system, a method for performing function calls from a Client Program stored in said common memory and being executed by a first one of said CPU's under control of a first of said two operating systems to a Server Program stored in said common memory and being executed by a second one of said CPU's under control of a second one of said two operating systems, said method comprising the steps of:

a. said Client Program calling a protocol procedure and passing thereto an identification of said Server Program;

b. said Client Program attempting to initiate said Server Program identified in the preceding step and if successful indicating the same to said Client Program;

c. said Client Program calling a proxy procedure for storing parameters in a Client program stack within said common memory;

d. said Server Program fetching said parameters from said Client program stack within said common memory;

e. said proxy procedure calling a protocol procedure for invoking said Server Program to perform a specific function with said parameters;

f. a stub procedure within said Server Program converting said parameters from a format compatible with said first operating system to a format compatible with said second operating system;

g. said Server Program performing said specific function;

h. said stub procedure converting results of the preceding step (if any) from a format compatible with said second operating system back to a format compatible with said first operating system;

i. said Server Program storing said results in a Server program stack within said common memory; and, j. said Client Program fetching said results from said Server program stack within said common memory.

12. A method as in claim 11 wherein said step of attempting to initiate said Server Program is unsuccessful and indicating such result to said Client Program.

13. A method as in claim 12 wherein said Client Program continuing with processing without accessing said Server Program.

14. A method as in claim 11 further including the step of said Client Program suspending operation while awaiting an indication that processing of said parameters has been completed.

15. A method as in claim 11 further including the step of repeating steps c through j for each occurrence that said Client Program makes a call to said Server Program to perform a function.

16. A method as in claim 11 and following step j thereof, further including the steps of said second operating system attempting to terminate said Server Program; determining if the preceding step was successful; and if so, said Server Program performing any required termination processing and returning an indication to said first operating system that termination was successful and said Server Program exiting operation.

17. A method as in claim 16 further including the said Client Program resuming normal processing.

18. A method as in claim 17 wherein said Client Program terminating function calls to said Server Program.

19. A method as in claim 18 further including the step of determining if more Server Program calls are required by said Client Program, and if so, repeating all the steps of claim 11.

* * * * *